(12) United States Patent
Kim et al.

(10) Patent No.: US 8,529,112 B2
(45) Date of Patent: Sep. 10, 2013

(54) LIGHT GUIDING BAR, BACKLIGHT ASSEMBLY HAVING THE SAME AND DISPLAY APPARATUS HAVING THE SAME

(75) Inventors: Young-Chan Kim, Incheon (KR); Hwan-Young Choi, Yongin-si (KR); Moon-Gyu Lee, Suwon-si (KR); Byoung-Ho Cheong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 57 days.

(21) Appl. No.: 13/238,512

(22) Filed: Sep. 21, 2011

(65) Prior Publication Data

US 2012/0188788 A1 Jul. 26, 2012

(30) Foreign Application Priority Data

Jan. 24, 2011 (KR) .................. 10-2011-0006657

(51) Int. Cl.
*F21V 7/04* (2006.01)
(52) U.S. Cl.
USPC ............................. 362/602; 362/613; 362/612
(58) Field of Classification Search
None
See application file for complete search history.

(56) References Cited

U.S. PATENT DOCUMENTS

| | | | |
|---|---|---|---|
| 2002/0008969 A1* | 1/2002 | Mabuchi et al. | 362/31 |
| 2002/0196617 A1* | 12/2002 | Huang | 362/27 |
| 2004/0234229 A1* | 11/2004 | Yagi et al. | 385/146 |
| 2008/0084708 A1 | 4/2008 | Lee et al. | |
| 2008/0252816 A1* | 10/2008 | Hwang et al. | 349/64 |
| 2009/0021948 A1 | 1/2009 | Kim et al. | |

FOREIGN PATENT DOCUMENTS

| | | |
|---|---|---|
| JP | 2003-151333 A | 5/2003 |
| KR | 10-0953163 B1 | 4/2010 |

* cited by examiner

*Primary Examiner* — Anh Mai
*Assistant Examiner* — Britt D Hanley
(74) *Attorney, Agent, or Firm* — Cantor Colburn LLP

(57) ABSTRACT

A light guiding bar includes first and second light incident portions, a light exit portion and a reflecting portion. The first and second light incident portions are at opposite ends of the light guiding bar and receive light. The light exit portion extends in a first direction, and partially totally reflects and partially emits the light according to an incident angle. The reflecting portion extends in the first direction, is adjacent to the light exit portion and includes a plurality of reflecting surfaces. Each of the reflecting surfaces has a wedge shape and reflects the light in a direction inclined with respect to a second direction substantially perpendicular to the first direction. The light incident into the first and second light incident portions and directly on the light exit portion is totally reflected by the light exit portion.

25 Claims, 16 Drawing Sheets

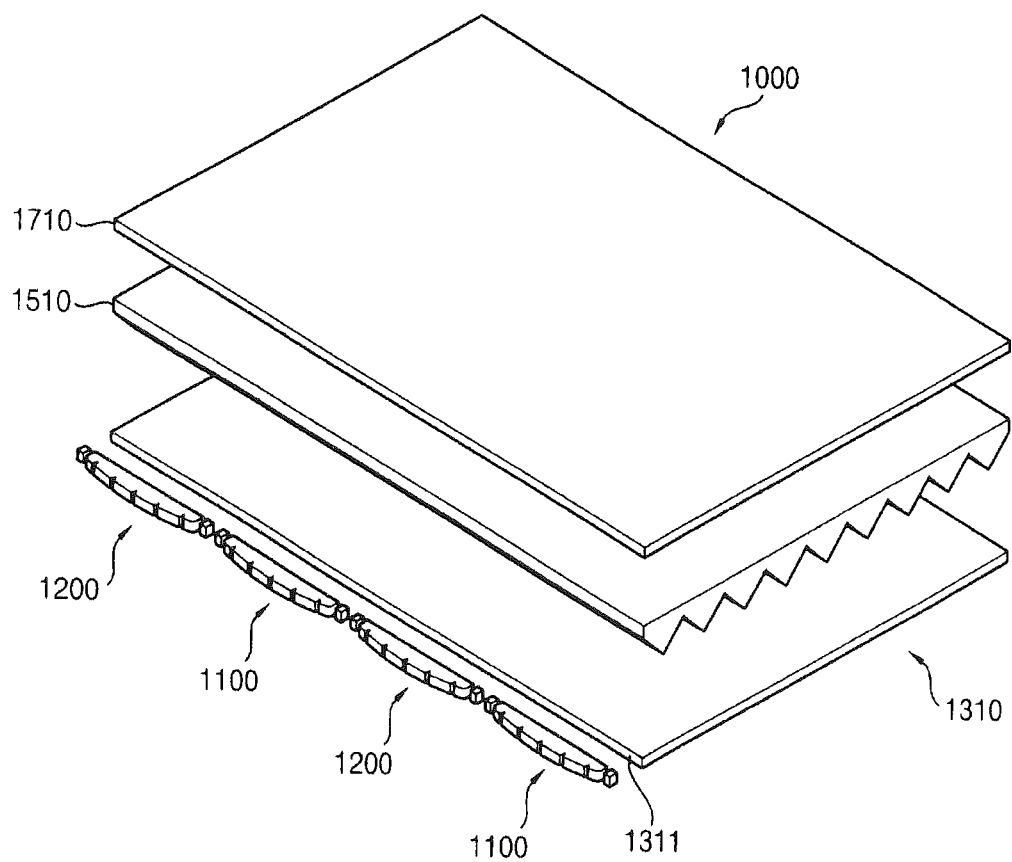

LIGHT GUIDING BAR, BACKLIGHT ASSEMBLY HAVING THE SAME AND DISPLAY APPARATUS HAVING THE SAME

This application claims priority to Korean Patent Application No. 2011-0006657, filed on Jan. 24, 2011, and all the benefits accruing therefrom under 35 U.S.C. §119, the contents of which are herein incorporated by reference in their entireties.

BACKGROUND OF THE INVENTION

1. Field of the Invention

Exemplary embodiments of the present invention relate to a light guiding bar, a backlight assembly having the light guiding bar and a display apparatus having the light guiding bar. More particularly, exemplary embodiments of the present invention relate to a light guiding bar capable of controlling a viewing angle and displaying a three-dimensional ("3D") stereoscopic image, a backlight assembly having the light guiding bar and a display apparatus having the light guiding bar.

2. Description of the Related Art

A non-emissive flat display apparatus such as a liquid crystal display apparatus ("LCD") includes a backlight assembly providing light, and a display panel displaying an image using the light. In addition, the display apparatus further includes an optical element which may enhance light characteristics to increase efficiency of using the light provided from the backlight assembly.

As the display apparatus is commonly used in various kinds of products, various needs on maintenance of public security and a less power consumption are increased for users of a mobile phone, a laptop computer, etc. For example, a viewing angle of the display apparatus needs to be changed according to users who want to maintain a private mode or open to a public using the mobile phone, the laptop computer, etc.

Conventionally, an additional optical film is attached to a monitor of the mobile phone, the laptop computer, etc., to change the viewing angle. However, the additional optical film is separately kept or carried by users, and the additional optical film is repeatedly attached and detached to the monitor, which are very inconvenient to the users.

In addition, the display apparatus may include a display panel displaying a 3D stereoscopic image in addition to a two-dimensional ("2D") image. In displaying the 3D stereoscopic image, different images should be respectively inputted to left and right eyes with a time interval, and thus special 3D glasses are conventionally used. However, wearing the 3D glasses is inconvenient because of heavy weight, bad fit and narrow viewing angle of the glasses. Thus, various methods for displaying the 3D stereoscopic image without using the glasses have been studied and developed.

BRIEF SUMMARY OF THE INVENTION

Exemplary embodiments of the invention provide a light guiding bar capable of controlling a viewing angle and displaying a three-dimensional ("3D") stereoscopic image without glasses.

Exemplary embodiments of the invention also provide a backlight assembly including the light guiding bar.

Exemplary embodiments of the invention also provide a display apparatus including the light guiding bar.

According to an exemplary embodiment of the invention, the light guiding bar includes first and second light incident portions at opposite ends of the light guiding bar and receiving light, a light exit portion which extends in a first direction and partially totally reflects the light and partially emits the light according to an incident angle, and a reflecting portion adjacent to the light exit portion and having a plurality of reflecting surfaces. Each of the reflecting surfaces has a wedge shape and reflects the light in a direction inclined with respect to a second direction substantially perpendicular to the first direction. The light incident into the first and second light incident portions and directly incident on the light exit portion is totally reflected by the light exit portion.

In an exemplary embodiment, a width of the light guiding bar at a central portion may be larger than a width at the ends.

In an exemplary embodiment, the light may exit toward the second light incident portion with an inclined angle between about 4° and about 7° with respect to the second direction when the light is incident into the first light incident portion. The light may exit toward the first light incident portion with an inclined angle between about −4° and about −7° with respect to the second direction when the light is incident into the second light incident portions.

In an exemplary embodiment, the light may exit toward the second light incident portion with an inclined angle between about 1° and about 3° with respect to the second direction when the light is incident into the first light incident portion. The light may exit toward the first light incident portion with an inclined angle between about −1° and about −3° with respect to the second direction when the light is incident into the second light incident portions.

According to another exemplary embodiment of the invention, a backlight assembly includes an oblique light guiding bar unit and light guiding plate. The oblique light guiding bar unit includes an oblique light guiding bar, a first light source and a second light source. The oblique light guiding bar includes first and second light incident portions at opposite ends of the oblique light guiding bar and receiving light, a light exit portion which extends in a first direction and partially totally reflects and partially emits the light according to an incident angle, and a reflecting portion which extends in the first direction and is adjacent to the light exit portion and having a plurality of reflecting surfaces. Each of the reflecting surfaces has a wedge shape and reflects the light in a direction inclined with respect to a second direction substantially perpendicular to the first direction. The light incident into the first and second light incident portions and directly incident on the light exit portion is totally reflected by the light exit portion. The first light source generates and supplies the light to the first light incident portion. The second light source generates and supplies the light to the second the light incident portion. The light guiding plate includes an incident surface receiving the light from the oblique light guiding bar unit and is adjacent to the light exit portion, a rear surface opposite to the incident surface, and a first surface emitting the light from the light guiding plate and connecting the incident surface with the rear surface.

In an exemplary embodiment, the first and second light sources may include light-emitting diodes ("LEDs").

In an exemplary embodiment, the backlight assembly may further include a turning sheet facing the first surface of the light guiding plate, and directing the light from the light guiding plate toward a front portion of the backlight assembly.

In an exemplary embodiment, the turning sheet may include a prism pattern facing the first surface of the light guiding plate.

In an exemplary embodiment, the turning sheet may include two dual brightness enhancing films ("DBEFs") having a prism pattern on a surface of the turning sheet opposite to the light guiding plate.

In an exemplary embodiment, a height of the incident surface may be larger than a height of the rear surface.

In an exemplary embodiment, a height of the incident surface may be smaller than a height of the rear surface, and the rear surface may include a reflection surface reflecting incident light.

In an exemplary embodiment, a number of the oblique light guiding bar unit may be plural, and the oblique light guiding bar units may be disposed in a line in the first direction.

In an exemplary embodiment, the backlight assembly may further include a straight light guiding bar unit. The straight light guiding bar unit may include a straight light guiding bar, a first light source and a second light source. The straight light guiding bar may include first and second light incident portions at opposite ends of the straight light guiding bar and receiving light, a light exit portion which extends in the first direction and partially totally reflects and partially emits the light according to an incident angle, and a reflecting portion which extends in the first direction and is adjacent to the light exit portion of the straight light guiding bar and has a plurality of light reflecting surfaces. Each of the reflecting surfaces may have a wedge shape and reflect the light toward the light exit portion of the straight light guiding bar in a direction inclined with respect to the second direction. The light incident into the first and second light incident portions of the straight light guiding bar and directly incident on the light exit portion of the straight light guiding bar is totally reflected on the light exit portion of the straight light guiding bar. The first light source of the straight light guiding bar unit may generate and supply the light to the first light incident portion of the straight light guiding bar. The second light source of the straight light guiding bar unit may generate and supply the light to the second the light incident portion of the straight light guiding bar.

In an exemplary embodiment, a number of the straight light guiding bar unit and a number of the oblique light guiding bar units may be plural. The straight light guiding bar units and the oblique light guiding bar units may be alternately disposed in a line in the first direction, respectively.

In an exemplary embodiment, the backlight assembly may further include a plurality of light source modules. The light source modules may be disposed on the incident surface of the light guiding plate in a line different from the line in which the oblique light guiding bar units and the straight light guiding bar units are disposed.

In an exemplary embodiment, a number of the oblique light guiding bar unit and a number of the straight light guiding bar unit may be plural. The oblique light guiding bar units may be disposed in a first line in the first direction and facing the incident surface of the light guiding plate, and the straight light guiding bar units may be disposed in a second line in the first direction and facing the incident surface of the light guiding plate. The first and second lines are in different planes.

In an exemplary embodiment, the light may exit toward the second light incident portion with an inclined angle between about 4° and about 7° with respect to the second direction when the first light source of the oblique light guiding bar unit is driven. The light may exit toward the first light incident portion with an inclined angle between about −4° and about −7° with respect to the second direction when the second light source of the oblique light guiding bar unit is driven.

In an exemplary embodiment, the backlight assembly may further include a complex sheet disposed over the first surface of the light guiding plate. The complex sheet changes an advancing path of the light from the light guiding plate and collects the light at positions in which two vision points of an observer are disposed.

In an exemplary embodiment, the light may exit toward the second light incident portion with an inclined angle between about 1° and about 3° with respect to the second direction when the first light source of the oblique light guiding bar unit is driven. The light may exit toward the first light incident portion with an inclined angle between about −1° and about −3° with respect to the second direction when the second light source of the oblique light guiding bar unit is driven.

According to another exemplary embodiment of the invention, a display apparatus includes an oblique light guiding bar unit, a light guiding plate, and a display panel. The oblique light guiding bar unit includes an oblique light guiding bar, a first light source and a second light source. The oblique light guiding bar includes first and second light incident portions at opposite ends of the oblique light guiding bar and receiving light, a light exit portion which extends in a first direction and partially totally reflects and partially emits the light according to an incident angle, and a reflecting portion which extends in the first direction and is adjacent to the light exit portion and has a plurality of reflecting surfaces. Each of the reflecting surfaces has a wedge shape and reflects the light toward the light exit portion in a direction inclined with respect to a second direction substantially perpendicular to the first direction. The light incident into the first and second light incident portions and directly incident on the light exit portion is totally reflected by the light exit portion. The first light source generates and supplies the light to the first light incident portion. The second light source generates and supplies the light to the second light incident portion. The light guiding plate includes an incident surface receiving the light from the oblique light guiding bar and adjacent to the light exit portion, a rear surface opposite to the incident surface, and a first surface which emits the light from the light guiding plate and connects the incident surface with the rear surface. The display panel displays images by using light from the light guiding plate In an exemplary embodiment, the display apparatus may further include a straight light guiding bar unit. The straight light guiding bar unit may include a straight light guiding bar, a first light source and a second light source. The straight light guiding bar may include first and second light incident portions at opposite ends of the straight light guiding bar and receiving light, a light exit portion which extends in the first direction and partially totally reflects and partially emits the light according to an incident angle, and a reflecting portion which extends in the first direction and is adjacent to the light exit portion of the straight light guiding bar and has a plurality of light reflecting surfaces. Each of the reflecting surfaces of the straight light guiding bar may have a wedge shape and reflect the light in a direction inclined with respect to the second direction. The light incident into the first and second light incident portions of the straight light guiding bar and on the light exit portion of the straight light guiding bar is totally reflected by the light exit portion of the straight light guiding bar. The first light source of the straight light guiding bar unit may generate and supply the light to the first light incident portion of the straight light guiding bar. The second light source of the straight light guiding bar unit may generate and supply the light to the second light incident portion of the straight light guiding bar.

In an exemplary embodiment, the display panel may display a first image inclined with respect to a viewing surface of the display panel when the light sources of the oblique light guiding bar unit are driven, and the display panel may display a second image perpendicular to the viewing surface of the display panel when the light sources of the oblique light guiding bar unit are driven.

In an exemplary embodiment, the light may exit toward the second light incident portion with an inclined angle between about 4° and about 7° with respect to the second direction when the first light source of the oblique light guiding bar unit is driven. The light may exit toward the first light incident portion with an inclined angle between about −4° and about −7° with respect to the second direction when the second light source of the oblique light guiding bar unit is driven.

In an exemplary embodiment, the display apparatus may further include a complex sheet which overlaps the first surface of the light guiding plate. The complex sheet may change an advancing path of the light from the light guiding plate and collect the light at positions in which two vision points of an observer are disposed.

In an exemplary embodiment, the complex sheet may include a Fresnel lens.

In an exemplary embodiment, the complex sheet may include a lenticular lens.

In an exemplary embodiment, the light may exit toward the second light incident portion with an inclined angle between about 1° and about 3° with respect to the second direction when the first light source of the oblique light guiding bar unit is driven. The light may exit toward the first light incident portion with an inclined angle between about −1° and about −3° with respect to the second direction when the second light source of the oblique light guiding bar unit is driven.

In an exemplary embodiment, the first and second light source of the oblique light guiding bar unit may be alternately driven. The display panel may display a first image perceived by a first vision point of the observer when the first light source of the oblique light guiding bar unit is driven. The display panel may display a second image perceived by a second vision point of the observer when the second light source of the oblique light guiding bar unit is driven.

According to exemplary embodiment of the invention, when using a straight light guiding bar unit and an oblique light guiding bar unit, light sources of the light guiding bar units are controlled to emit the light toward a front direction or viewing direction. Thus, distribution of exiting light may be controlled without an additional film. In addition, an exiting angle of the light may be controlled without the additional film such as a security film separately kept or carried by users.

In addition, since the light is provided to a predetermined position, the image may be displayed with low power consumption. In addition, the light is condensed at the predetermined position, and thus the image having a high luminance may be displayed.

In addition, using an oblique light guiding bar unit, the light may be emitted to a side direction or a front direction, and thus a plurality of images may be displayed according to viewing angles of the observer. Thus, a movie may be displayed on a front view, and a global-positioning system ("GPS") map may be displayed on a side view at the same time.

In addition, the light sources are selectively driven based on a position of the observer to display the image, using a sensor detecting the position of the observer. Thus, even though the number of the observers is changed, the number of the driven light sources is constant, so that the image having a high luminance may be displayed with low power consumption.

In addition, left and right light sources of the oblique light guiding bar unit are alternately driven to emit the light to left and right directions respectively, so that a 3D stereoscopic image may be displayed without special glasses. In addition, the 3D stereoscopic image may be displayed without an additional special film separately kept or carried by users, or a polarization film.

In addition, the light condensed by the light guiding bar unit and the light guiding plate is provided, so that the high luminance image may be displayed to the observer. A pattern of the light incident portion in the light guiding bar unit is changed to control a light advancing path or to prevent a crosstalk from occurring due to a broad distribution of the light, and so on.

BRIEF DESCRIPTION OF THE DRAWINGS

The above and other features of the present invention will become more apparent by describing in detail exemplary embodiments thereof with reference to the accompanying drawings, in which:

FIG. 5 is an exploded perspective view illustrating an exemplary embodiment of a display apparatus including the straight light guiding bar in FIG. 4A;

DETAILED DESCRIPTION OF THE INVENTION

Figure 1A:
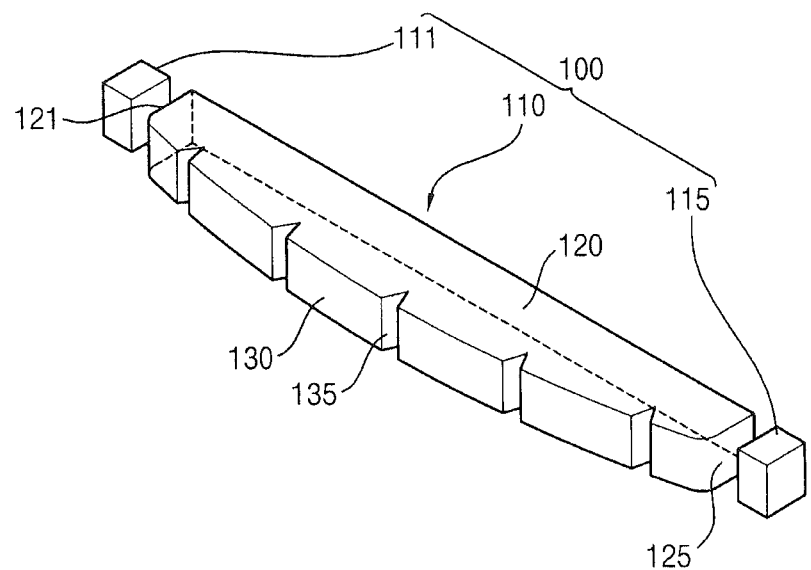
FIG. 1A is a perspective view illustrating an exemplary embodiment of a light guiding bar according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "upper" or "above" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1A is a perspective view illustrating an exemplary embodiment of a light guiding bar according to the present invention. As used herein, a bar indicates an elongated shape, having a length substantially greater than a width Referring to FIG. 1, the light guiding bar 110 includes first and second light incident portions 121 and 125 opposite to each other and receiving light, a light exit portion 120 partially totally reflecting and partially emitting the light according to an incident angle, and a reflecting portion 130 having a plurality of reflecting surface 135. The reflecting portion 130 is opposite to the light exit portion 120. Each of the reflecting surfaces 135 has a wedge shape and reflects the light to a direction inclined with respect to a direction substantially perpendicular to the light exit portion 120. The light is incident into the first and second light incident portions 121 and 125 and totally reflected on the light exit portion 120.

The light guiding bar 110 is a single, unitary, indivisible member including the first and second light incident portions 121 and 125, the light exit portion 120 and the reflecting portion 130 including the reflecting surface 135. As illustrated in FIG. 1, the width of the light guiding bar at a central portion is larger than a width at ends thereof.

A first light source 111 supplies the light to the first light incident portions 121, and a second light source 115 supplies the light to the second light incident portions 125. The first and second light sources 111 and 115 may include a light-emitting diode ("LED"). The light entering through the first and second light incident portions 121 and 125 directly advances to the reflecting portion 130, or is reflected on the light exit portion 120 once and advances to the reflecting portion 130. Then, the light is reflected on the reflecting portion 130. An angle of the light reflecting surface 135 with respect to the first and second light incident portions 121 and 125 is controlled, so that an exit angle of the light from the light exit portion 120 may be controlled.

Figure 1B:
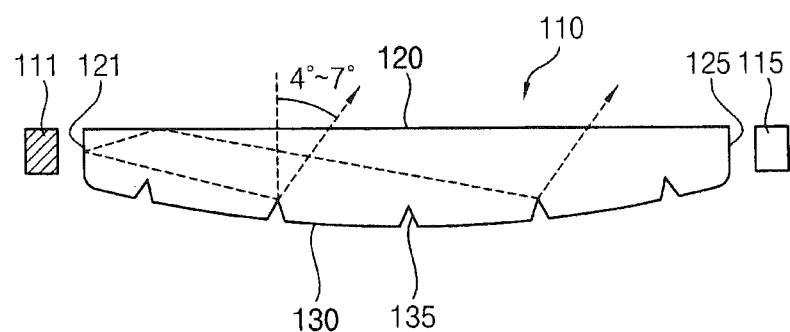
FIG. 1B is a plan view illustrating an operation of a first light source of a light guiding bar unit including the light guiding bar in FIG. 1A.
Figure 1C:
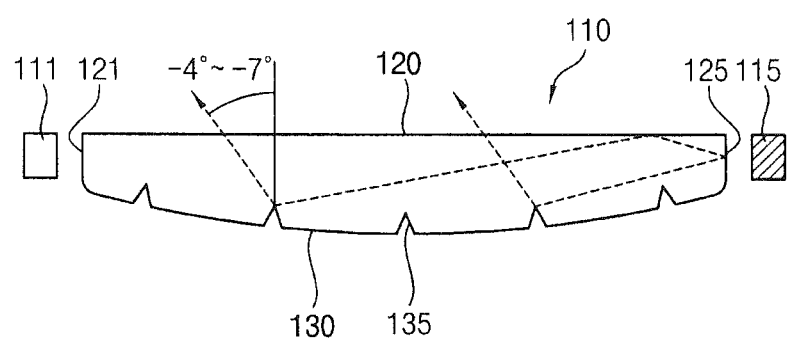
FIG. 1C is a plan view illustrating an operation of a second light source of the light guiding bar unit in FIG. 1B.

FIG. 1B is a plan view illustrating an operation of the first light source 111 of a light guiding bar unit 100 including the light guiding bar 110 in FIG. 1A. FIG. 1C is a plan view illustrating an operation of the second light source 115 of the light guiding bar unit 100 including the light guiding bar 100 in FIG. 1B.

Referring to FIGS. 1B and 1C, a first light source 111 and a second light source 115 are respectively disposed adjacent to the first and second light incident portions 121 and 125. The first light source 111 and the second light source 115 generate and supply the light incident into the light guiding bar 110. In FIG. 1B, the first light source 111 is turned on and the second light source 115 is turned off. The light incident into the light guiding bar 110 from the first light source 111 is reflected on the reflecting surface 135 of the reflecting portion 130. The reflected light exits with an inclined angle toward the second light source 115 with respect to the direction substantially perpendicular to the light exit portion 120. Likewise, in FIG. 1C, the second light source 115 is turned on and the first light source 111 is turned off. The light incident into the light guiding bar 110 from the second light source 115 is reflected on the reflecting surface 135 of the reflecting portion 130. The reflected light exits with an inclined angle toward the first light source 111 with respect to the direction substantially perpendicular to the light exit portion 120. The exit angle of the light from the light guiding bar 110 may be controlled by turning on/off the first and second light source 111 and 115.

Figure 1D:
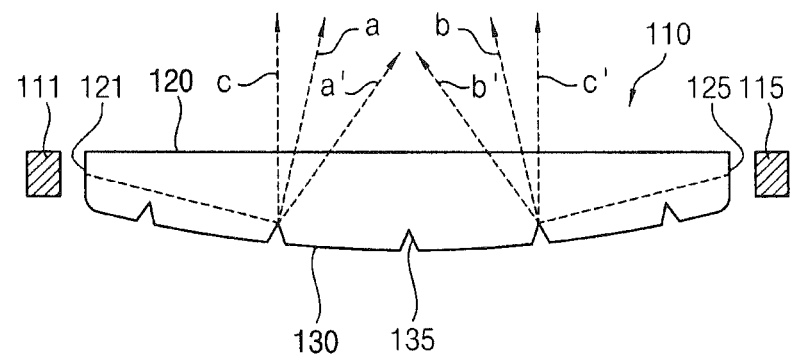
FIG. 1D is a plan view illustrating an operation of first and second light sources of the light guiding bar unit in FIG. 1B.

FIG. 1D is a plan view illustrating an operation of the first and second light sources 111 and 115 of the light guiding bar unit 100 including the light guiding bar 110 in FIG. 1B.

Referring to FIG. 1D, the light incident into the first and second light incident portions 121 and 125 is reflected on the reflecting surface 135 and exits to various directions. An angle of the reflecting surface 135 of the reflecting portion 130 having the wedge shape is controlled to change an exit angle of light exiting through the light exit portion 120. As illustrated and mentioned above, light a and light a' exit with the inclined angle with respect to line c which is substantially perpendicular to the light exit portion 120. Exit angles of the light a and the light a' are changed by controlling an angle of the reflecting surface 135 of the reflecting portion 130. The light incident into the first and second light incident portions 121 and 125 is reflected on an inclined surface of the reflecting surface 135 having the wedge shape and exits the light guiding bar 110. As a vertex angle of the wedge shaped light reflecting surface 135 increases, an exit angle of light increases from the light a to the light a'.

As illustrated and mentioned above, light b and the b' exit with the inclined angle with respect to line c' which is substantially perpendicular to the light exit portion 120. Exit angles of the light b and the light b' are changed by controlling an angle of the reflecting surface 135 of the reflecting portion 130. In one exemplary embodiment, for example, in an asymmetric light guiding bar, the light may exit like the light a' at a right side and may exit like the light b at a left side with respect to the direction substantially perpendicular to the light exit portion 120.

Generally, right and left exit angles may be between about −6° and about −4° or between about 4° and about 6° with respect to a line substantially perpendicular to the light exit portion 120, to display the image to the observers located at both end sides (left and right end sides). In one exemplary embodiment, for example, the right and left exit angles may be between about −5° and about 5° by controlling dimensions of the reflecting surface 135. Additionally, the right and left exit angles may be between about −3° and about −1°, or between about 1° and about 3° with respect to the line substantially perpendicular to the light exit portion 120, to display a three-dimensional ("3D") stereoscopic image. In one exemplary embodiment, for example, the right and left exit angles may be between about −2° and about 2° by controlling the reflecting surface 135.

Figure 2:
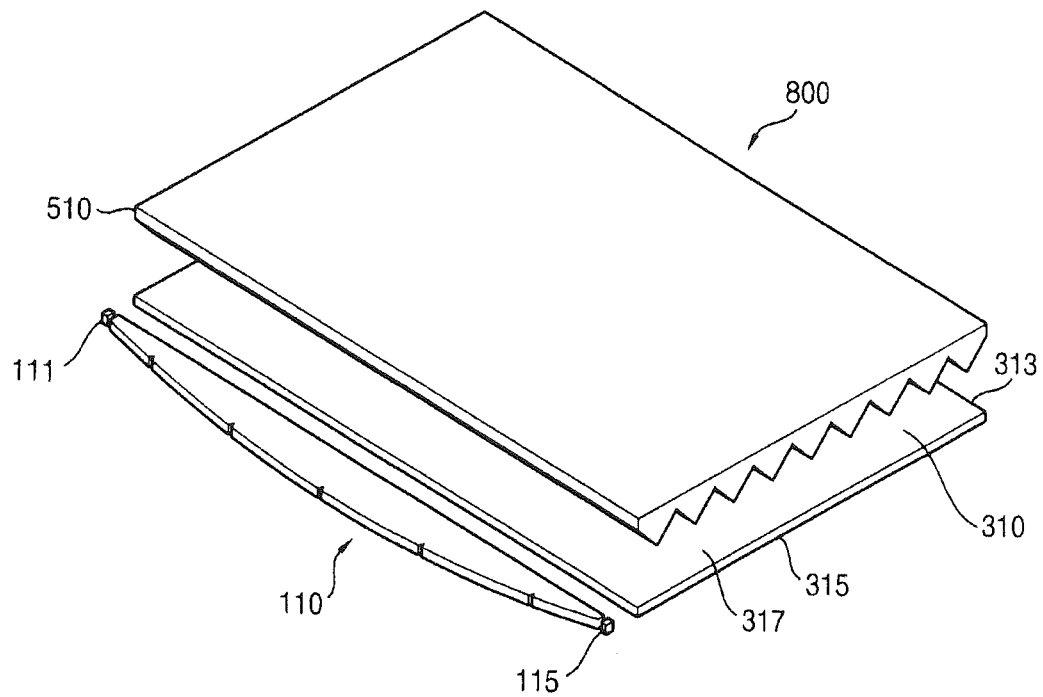
FIG. 2 is an exploded perspective view illustrating an exemplary embodiment of a backlight assembly including the light guiding bar in FIG. 1A.

FIG. 2 is an exploded perspective view illustrating an exemplary embodiment of a backlight assembly including the light guiding bar 110 in FIG. 1A.

The backlight assembly 800 includes the light guiding bar 110, the first light source 111, the second light source 115 and a light guiding plate 310. The light guiding bar 110 includes substantially the same or like parts as the light guiding bar 110 in FIG. 1A, and thus further repetitive explanation concerning the above elements will be omitted.

The first light source 111 supplies the light to a first light incident portion of the light guiding bar 110, and the second light source 115 supplies the light to a second light incident portion of the light guiding bar 110. The light guiding plate 310 includes an incident surface 311 receiving the light and adjacent to the light exit portion 120 of the light guiding bar 110, a rear surface 313 facing the incident surface 311, a reflecting surface 315, and a first surface 317 emitting light and connecting the incident surface 311 and the rear surface 313. The light guide plate 310 may have a uniform thickness, such that a height of the incident surface 311 is the same as a height of the rear surface 313. Alternatively, the height of the incident surface 311 may be larger or smaller than a height of the rear surface 313. The heights are taken perpendicular to the first surface 317.

The backlight assembly 800 according to the illustrated exemplary embodiment may further include a turning sheet 510 disposed on the first surface 317 of the light guiding plate 310. The turning sheet 510 turns the light to an upper portion of the light guiding plate 310.

Referring to FIG. 2, the backlight assembly 800 includes one light guiding bar unit 100 and the light guiding plate 310. However, as a size of the light guiding plate 310 increases, a width of light guiding bar 110 increases so that thickness of a bezel may increase. Thus, a plurality of small-sized light guiding bars 110 may be disposed instead of one large-sized light guiding bar 100 to decrease the thickness of the bezel.

Figure 3:
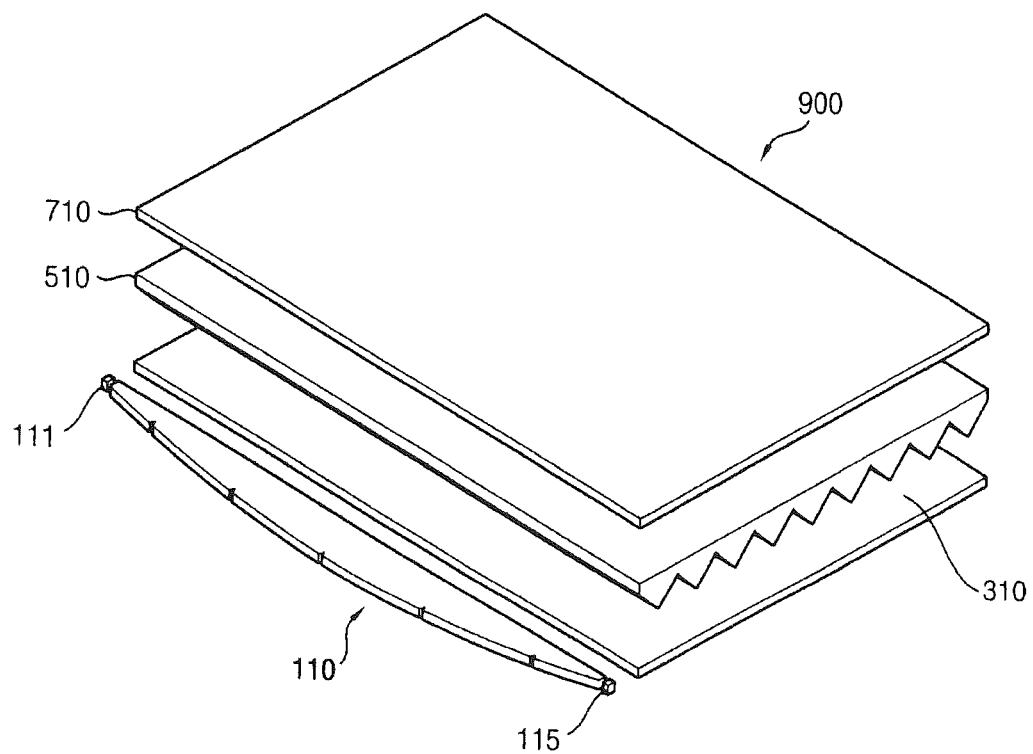
FIG. 3 is an exploded perspective view illustrating an exemplary embodiment of a display apparatus including the light guiding bar in FIG. 1A.

FIG. 3 is an exploded perspective view illustrating a display apparatus including the light guiding bar 110 in FIG. 1A.

Referring to FIG. 3, the display apparatus 900 according to the illustrated exemplary embodiment includes the light guiding bar 110, the first light source 111, the second light source 115, the light guiding plate 310, the turning sheet 510 and a display panel 710. The light guiding bar 110, the first light source 111, the second light source 115, the light guiding plate 310 and the turning sheet 510 are substantially the same as those in FIGS. 1A and 2, and thus further repetitive explanation concerning the above elements will be omitted.

The first and second light sources 111 and 115 adjacent to the light guiding bar 110 is used, so that the light may exit along the inclined directions different from each other as above mentioned. The light exiting along the inclined directions different from each other passes through the light guiding plate 310 and the turning sheet 510, and reaches the display panel 710. Therefore, when the first light source 111 is turned on and the second light source 115 is turned off, the light inclined toward the second light source 115 is supplied to the display panel 710. In addition, when the first light source 111 is turned off and the second light source 115 is turned on, the light inclined toward the first light source 111 is supplied to the display panel 710. Accordingly, the light is provided to the display panel 710 with the directions different from each other, so that the display panel 710 may display different images to right and left directions respectively.

In one exemplary embodiment, for example, when a global positioning system ("GPS") image is displayed on the display panel 710, two different images respectively are provided to a driver and a passenger. Additionally, without the passenger, power consumption may be decreased by turning off light sources for the passenger. Various applications of displaying the images different in right and left directions may be possible.

Figure 4A:
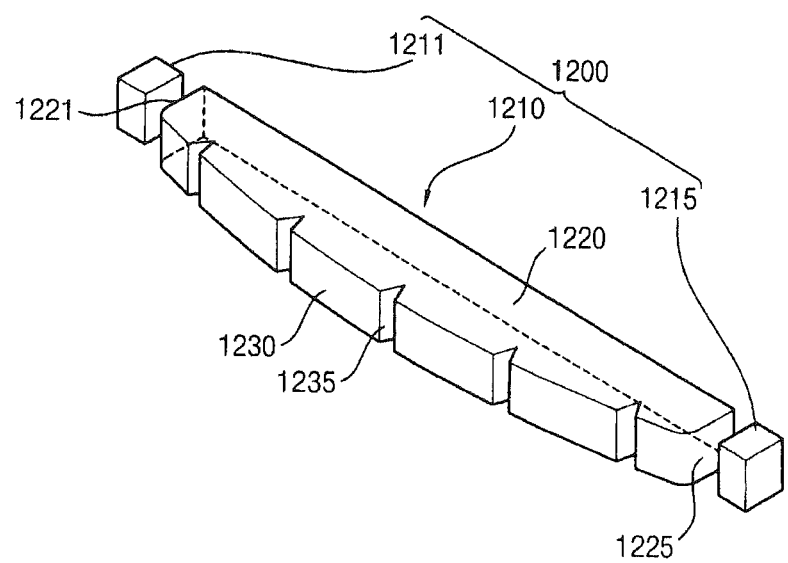
FIG. 4A is a perspective view illustrating exemplary embodiment of a straight light guiding bar according to the present invention.
Figure 4B:
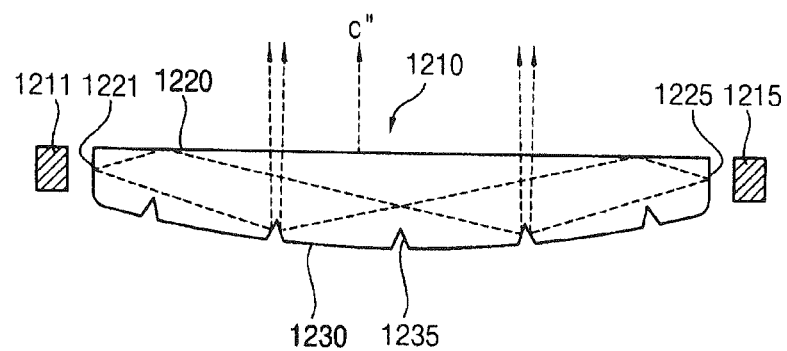
FIG. 4B is a plan view illustrating the straight light guiding bar in FIG. 4A.

FIG. 4A is a perspective view illustrating an exemplary embodiment of a straight light guiding bar according to the present invention. FIG. 4B is a plan view illustrating the straight light guiding bar in FIG. 4A.

A straight light guiding bar unit 1200 includes the straight light guiding bar 1210 and light sources 1211 and 1215. The straight light guiding bar 1210 in FIG. 4A includes a light exit portion 1220, light incident portions 1221 and 1225, and a reflecting portion 1230. The light incident portions 1221 and 1225 are respectively adjacent to both ends of light exit portion 1220, and the light incident portions 1221 and 1225 receive the light from the light sources 1211 and 1215.

Referring to FIG. 4B, the light sources 1211 and 1215 respectively supply light to the light incident portions 1221 and 1225. The reflecting portion 1230 is opposite to the light exit portion 1220 and has a plurality of reflecting surfaces 1235. Each of the reflecting surfaces 1235 has a wedge shape and reflects the light to a direction inclined with respect to a direction substantially perpendicular to the light exit portion 1220. The light is incident into the first and second light incident portions 1221 and 1225 and totally reflected on the light exit portion 120. The light entering through the first and second light incident portions 1221 and 1225 directly advances to the reflecting portion 130, or is reflected on the light exit portion 120 once and advances to the reflecting portion 130. Then, the light is reflected on the reflecting portion 1230. An angle of the light reflecting surface 1235 with respect to the light incident portions 1221 and 1225 is controlled, so that the light exits a direction c" substantially perpendicular to the light exit portion 1220.

FIG. 5 is an exploded perspective view illustrating a display apparatus including the straight light guiding bar 1210 in FIGS. 4A and 4B.

The display apparatus 1000 in FIG. 5 includes an oblique light guiding bar unit 1100, the straight light guiding bar unit 1200, a light guiding plate 1310, a turning sheet 1510 and a display panel 1710. The light guiding plate 1310 includes an incident surface 1311, a rear surface 1313 facing the incident surface 1311, a reflecting surface and a first surface 1317. The oblique light guiding bar unit 1100 includes substantially the same or like parts as that in FIG. 1A, the straight light guiding bar unit 1200 includes substantially the same or like parts as that in FIG. 4A, and the light guiding plate 1310 and the turning sheet 1510 are substantially the same as those in FIG. 3. Therefore, further repetitive explanation concerning the above elements will be omitted.

Referring to FIGS. 2 and 3 again, a backlight assembly and a display apparatus according to the illustrated exemplary embodiments may emit the light along a side direction. Thus, when a user uses the display apparatus in front of the display apparatus, brightness may be insufficient to the observer. To solve the problem, the backlight assembly and the display apparatus may include the straight light guiding bar unit 1200 and the oblique light guiding bar unit 1100 according to the illustrated exemplary embodiment to emit the light to various directions.

Figure 6A:
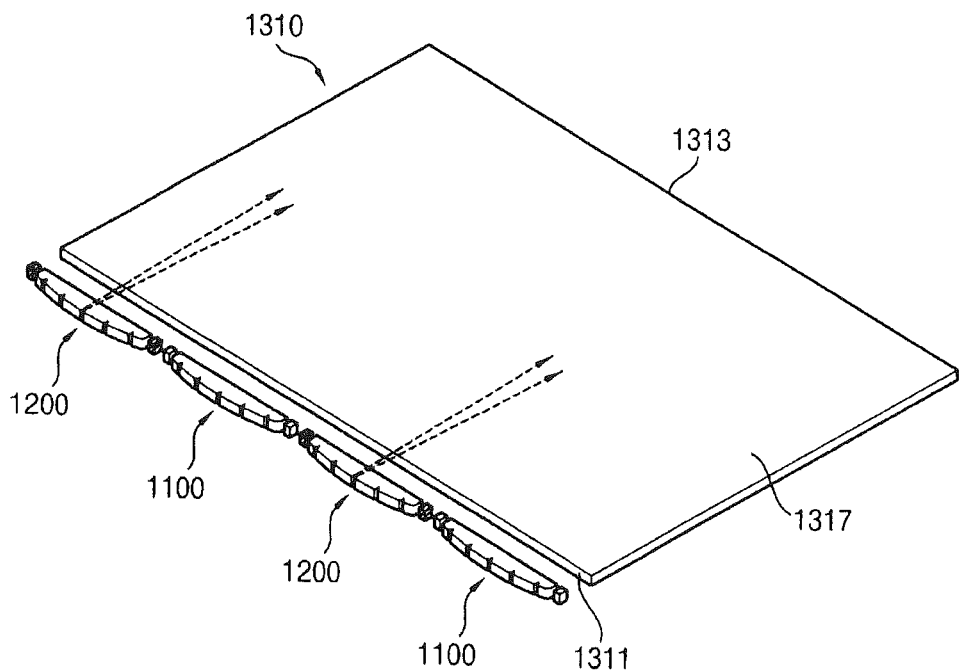
FIG. 6A and FIG. 6B are perspective views illustrating an operation of the display apparatus in FIG. 5.
Figure 6B:
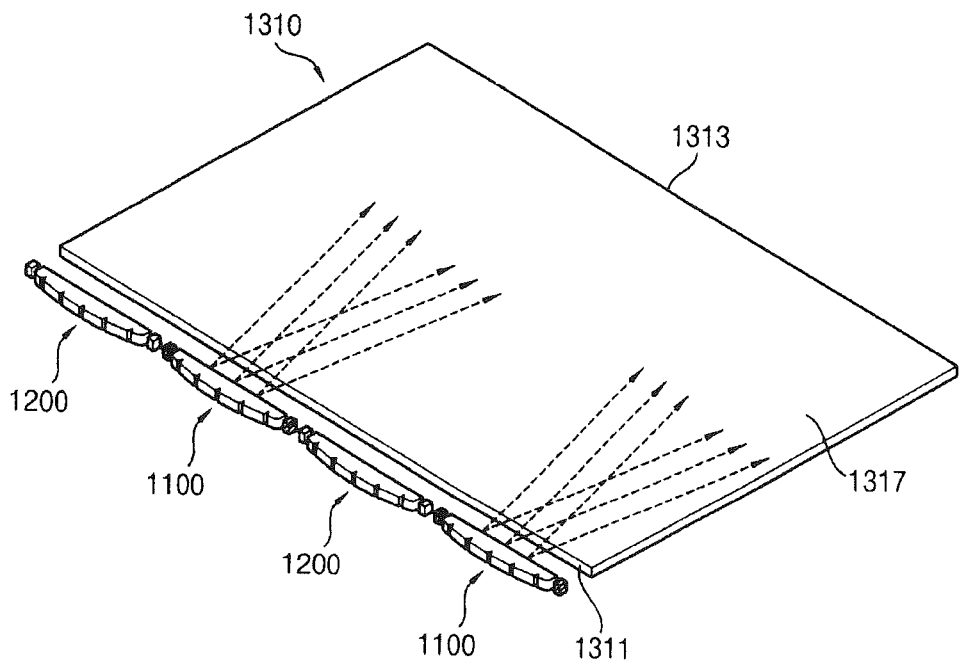

FIG. 6A and FIG. 6B are a perspective view illustrating an operation of the display apparatus 1000 in FIG. 5. More particularly, FIG. 6A is a perspective view illustrating a front operation mode of a backlight assembly of the display apparatus in FIG. 5. FIG. 6B is a perspective view illustrating a side operation mode of the backlight assembly of the display apparatus in FIG. 5.

The backlight assembly in FIG. 5, controls advancing directions of light from light guiding bar units 1100 and 1200, to the light guiding plate 1310 to control a light emitting pattern to the light guiding plate 1310. Referring to FIG. 6A, straight light guiding bar units 1100 and oblique light guiding bar units 1200 are alternately disposed. In FIG. 6A, the straight light guiding bar units 1100 are only turned on, and light advancing substantially perpendicular to the incident surface 1311 of the light guiding plate 1310 is only incident into the light guiding plate 1310. Thus, the observer in front of the display apparatus may watch the image and the display apparatus 1000 operates as a security or private mode. According to the exemplary embodiment, only the light source is controlled without the need for additional sheets attached to viewing portion of the display apparatus 1000, so that the security or private mode may be operated. In addition, the light source is partially driven, and thus power consumption may be decreased.

In FIG. 6B, the oblique light guiding bar units 1100 is only turned on. Thus, light advancing inclined with respect to the incident surface 1311 of the light guiding plate 1310 is only incident into the light guiding plate 1310. In this case, the observer in front of the display apparatus may not watch the image compared to the front operation mode in FIG. 6A, but the observer at sides of the display apparatus may watch the image. In addition, the light source is partially turned off, and thus power consumption may be decreased. Although not shown in FIG. 6A or 6B, the straight light guiding bar units 1100 and the oblique light guiding bar units 1200 may be turned on at the same time, and the observer in front of and at the sides of the display apparatus may watch the image displayed on the display apparatus.

Figure 7:
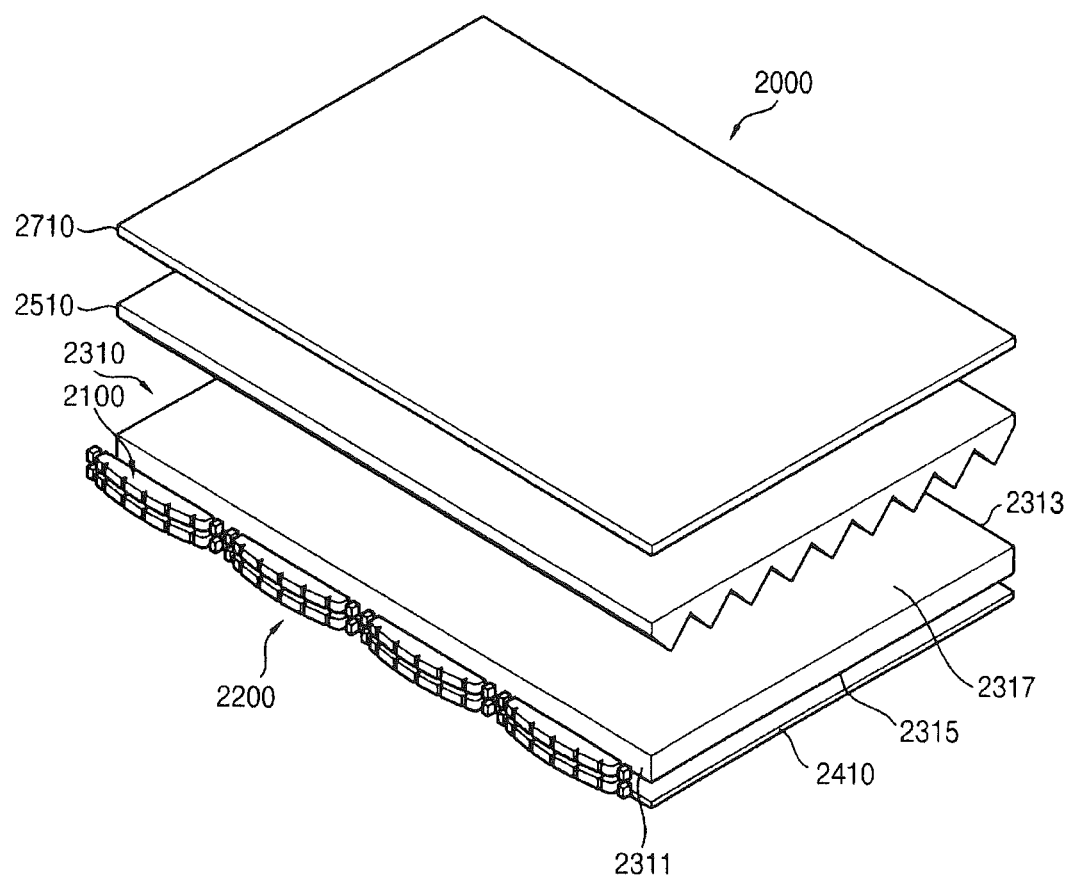
FIG. 7 is an exploded perspective view illustrating still another exemplary embodiment of a display apparatus according to the present invention.

FIG. 7 is an exploded perspective view illustrating another exemplary embodiment of a display apparatus according to the present invention.

Referring to FIG. 7, the display apparatus 2000 according to the illustrated exemplary embodiment includes a plurality of oblique light guiding bar units 2100 arranged in a first line parallel to a longitudinal direction of the display apparatus 2000, a plurality of straight light guiding bar units 2200 arranged in a second line different from the first line and parallel to the longitudinal direction of the display apparatus 2000, and a light guiding plate 2310. The oblique light guiding bar units 2100 and the straight light guiding bar units 2200 are on different planes, and overlap each other in a thickness direction of the light guiding plate 2310. Each of the oblique light guiding bar units 2100 includes substantially the same or like parts as the light guiding bar unit 100 in FIG. 1A. Each of the straight light guiding bar units 2200 includes substantially the same or like parts as the straight light guiding bar unit 1200 in FIG. 4A. The light guiding plate 2310 includes substantially the same or like parts as the light guiding plate 310 in FIG. 3. Thus, further repetitive explanation concerning the above elements will be omitted.

According to a thickness of an incident surface 2311 of the light guiding plate 2310, the light guiding bar units 2100 and 2200 may be thinly manufactured and disposed in a plurality of overlapping lines. In addition, as a size of the light guiding bar units 2100 and 2200 is decreased, a size of an LED as a light source may also be decreased. For each light guiding bar unit 2100 and 220, a light source is disposed at both of opposing sides of the light guiding bar. Although not shown in the figures, each of the light guiding bar units may have a light source disposed at only one side of the light guiding bar. In this case, as a distance from the light source is increased, depth between a reflecting portion and a light exit portion of the light guiding bar is decreased. A reflecting surface of the reflecting portion reflects the light. According to an angle of the reflecting surface, straight and inclined light exits from the light guiding bar of the light guiding bar unit.

The light guiding plate 2310 includes the incident surface 2311 receiving the light and adjacent to the light exit portions of the light guiding bar unit 2100 and the oblique light guiding bar units 2200, a rear surface 2313 facing the incident surface 2311, a first surface 2315 reflecting light, and a second surface 2317 emitting the light and connecting the incident surface 2311 with the rear surface 2313. Additionally, the display apparatus 2000 according to the illustrated exemplary embodiment may further include a turning sheet 2510, a display panel 2710 and a reflecting plate 2410. The reflecting plate 2410 is disposed under the first surface 2315 of the light guiding plate 2310, and enhances reflecting effect of the first surface 2315. In addition, the light guiding plate 2310 may further include a diffuser sheet (not shown) disposed on the turning sheet 2510 to enhance light distribution.

The turning sheet 2510 changes a direction of light from the light guiding plate 2310 to a direction substantially perpendicular to the second surface 2317 of light guiding plate 2310. Prism patterns of the turning sheet 2510 are substantially parallel with the incident surface 2311 or the rear surface 2313 of the light guiding plate 2310. Therefore, a slope of light formed by the oblique light guiding bar unit 2100 is maintained, and the light exits to a front portion of the turning sheet 2510 on a viewing side of the display apparatus 2000.

In addition, although not shown in the figures, the display apparatus 2000 may further include conventional light source modules (not shown) in addition to the oblique light guiding bar unit 2100 and the straight light guiding bar unit 2200. The conventional light source modules may be used for a normal display mode of the display apparatus 2000. A conventional light source module may be disposed between the first line of the oblique light guiding bar units 2100 and the second line of the straight light guiding bar units 2200. Alternatively, the conventional light source module may be disposed in a third line different from (e.g., not coplanar with) the first line and the second line, and disposed over the first line or under the second line. Additionally, the oblique light guiding bar unit 2100 and the straight light guiding bar unit 2200 may be alternately disposed in the first line, and the conventional light source module may be disposed in a second line. The conventional light source module used for the normal display mode emits dispersed light which uniformly exits over the entire areas.

Figure 8A:
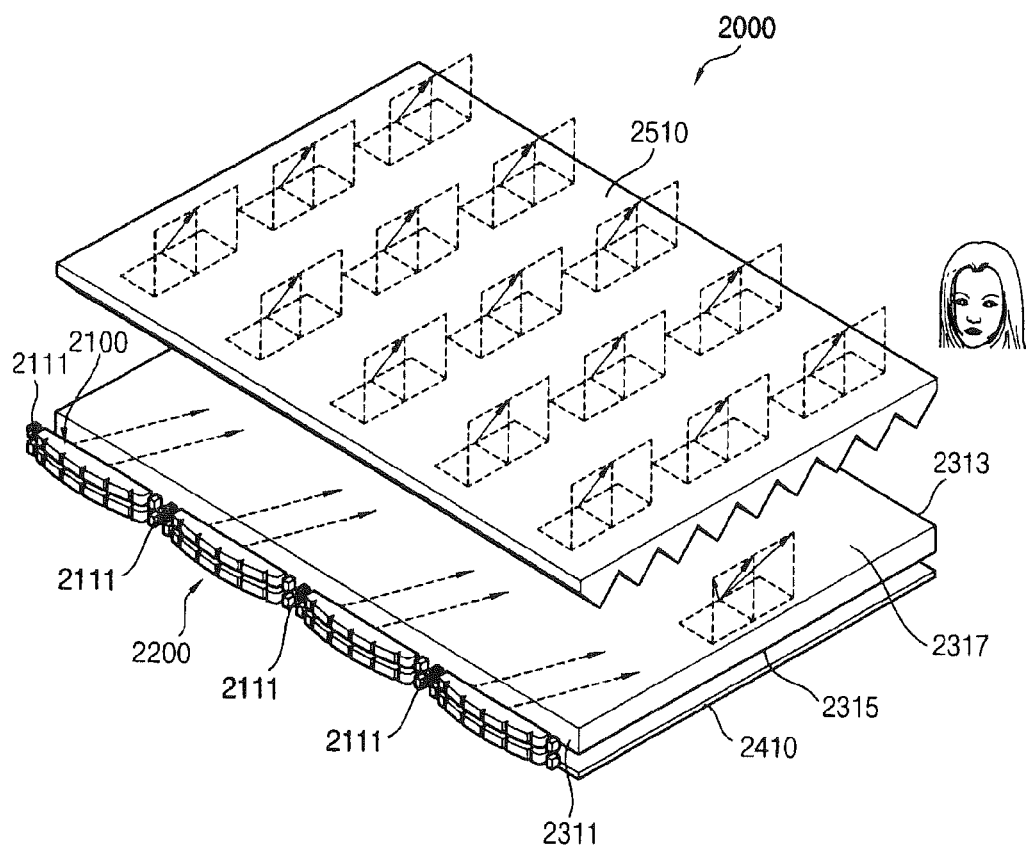
FIGS. 8A to 8C are exploded perspective views illustrating an operation of the display apparatus in FIG. 7.
Figure 8B:
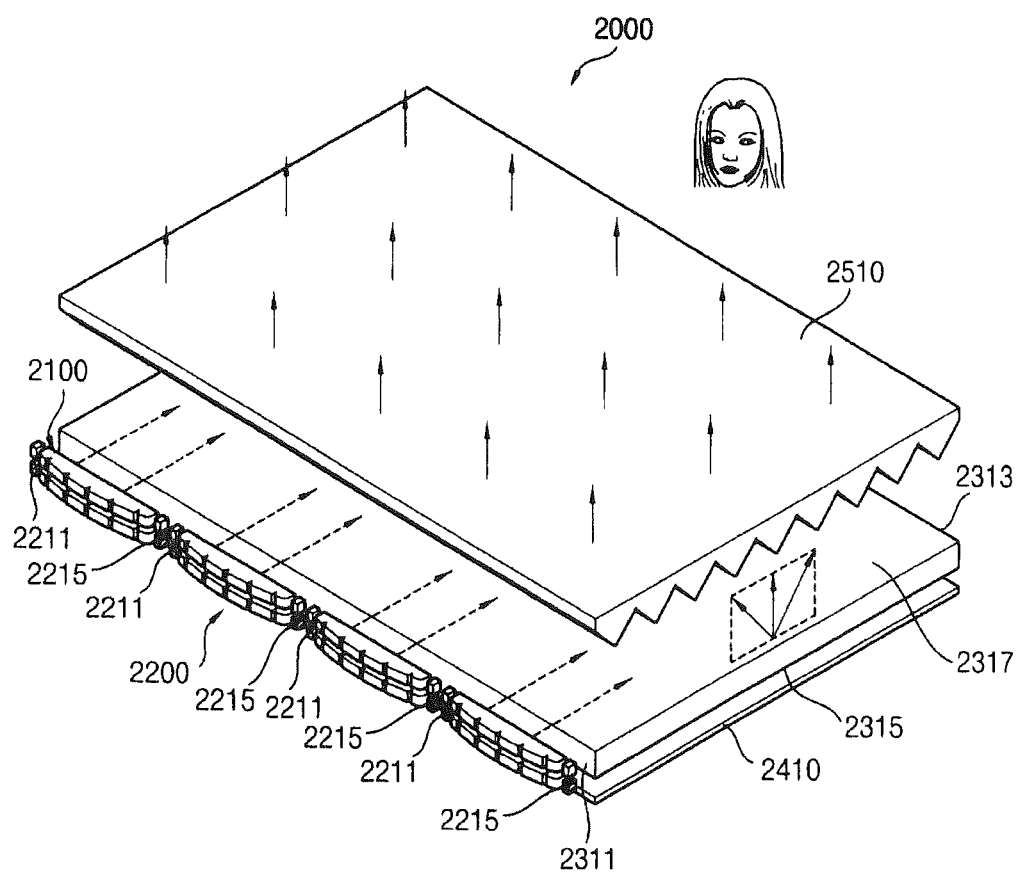
Figure 8C:
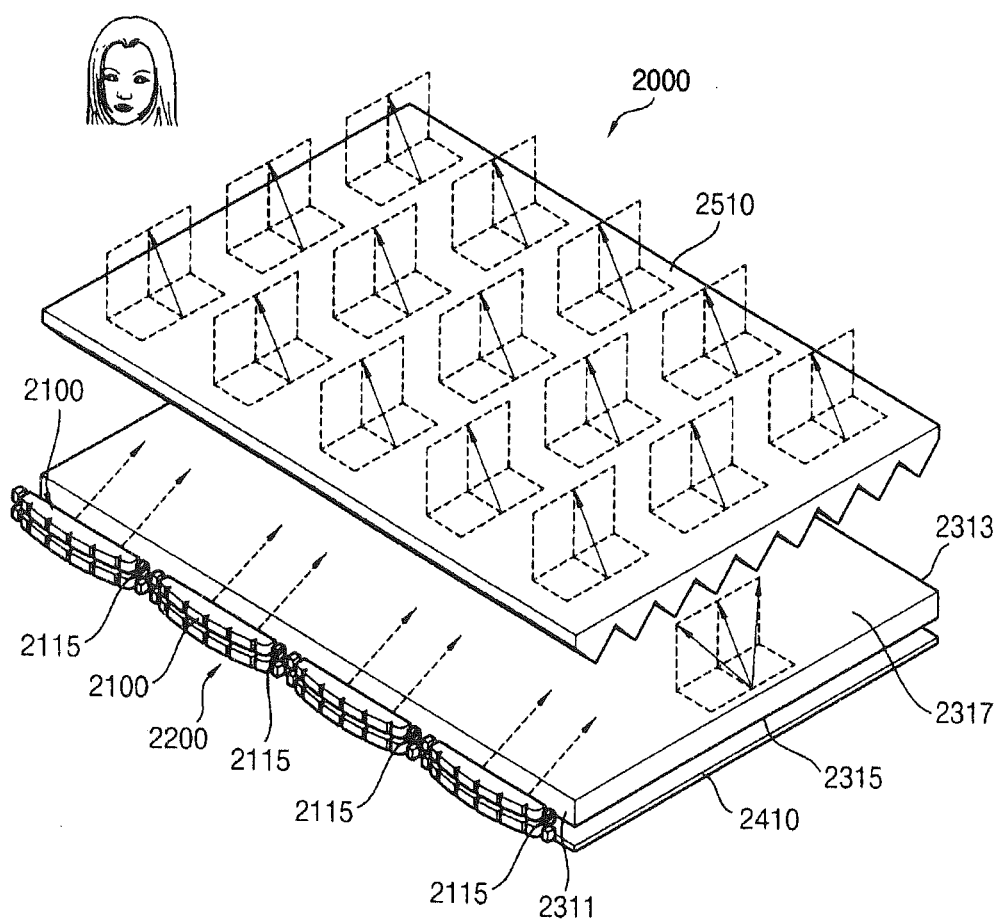

FIG. 8A to 8C are an exploded perspective view illustrating an operation of the display apparatus 2000 in FIG. 7.

The display apparatus according to the illustrated exemplary embodiment may further include a position sensor (not shown) detecting a position of the observer. The position sensor detects the position of the observer and transmits position data to a backlight assembly. The backlight assembly may display images toward the observer based on the position data. The oblique light guiding bar unit 2100 and the straight light guiding bar unit 2200 are selectively driven, so that an advancing path of the light exiting from the light guiding plate 2310 may be controlled. The backlight assembly emits the light toward the observer by detecting a movement or a direction of the user, so that the observer may always watch a bright image, which is referred to as a user tracking mode. In the user tracking mode, the light always advances to one direction, so that power consumption may be maintained as low as possible.

Referring to FIG. 8A to 8C, the display apparatus 2000 according to the illustrated exemplary embodiment tracks the observer by controlling light sources according to an angle of the observer. The display panel 2710 of the display apparatus 200 is omitted for convenience of explanation.

Referring to FIG. 6A again, the display apparatus 2000 according to the illustrated exemplary embodiment includes a line of the oblique light guiding bar units 2100 and a different line of the straight light guiding bar units. Referring to FIG. 8A, the observer is located at a right side of the display apparatus 2000. Here, left and right sides are defined with respect to the display apparatus 2000 in FIG. 8A. A lower side is defined at the side of the light guiding bar units, an upper side is defined at the side of the rear surface 2313 and the front side is defined at the viewing side of the display apparatus 2000 in FIG. 8A. The oblique light guiding bar unit 2100 and the straight light guiding bar unit 2200 are disposed under the light guiding plate 2310, and the light passing through the light guiding plate 2310 and the turning sheet 2510 exits toward the user in front of the display apparatus 2000.

Referring to FIG. 8A, the observer is located at the right side of the display apparatus assembly 2000, and thus light sources 2111 at the left side of the oblique light guiding bar units 2100 are turned on. The light advances toward a right upper direction of the light guiding plate 2310 from the oblique light guiding bar units 2100, as illustrated by the dotted line arrows extending from the oblique light guiding bar units 2100. The light advances toward an right upper front, a right lower front and a right front directions of the turning sheet 2510 from the light guiding plate 2310 as illustrated by the arrows within dotted lines shown on the light guide plate 2310. The light is refracted on the turning sheet 2510 from the right upper-lower-front directions to the right front direction, and thus the light advancing toward the right direction of the turning sheet 2510 is maintained as illustrated by the arrows within dotted lines shown on the turning sheet 2510. Thus, the light advancing toward the front direction and the right direction of the turning sheet 2510 exits from the turning sheet 2510. Therefore, the observer located at the right side of the display apparatus 2000 may watch the image. In this case, the images displayed to the observer located at the right side of the front may be different from those displayed to the observer located at a different side of the front of the display apparatus 2000.

Referring to FIG. 8B, the observer is located at a mid-section of the display apparatus 2000, and thus the light sources 2111 and 2215 of the straight light guiding bar units 2200 are turned on. The light advances toward an upper direction of the light guiding plate 2310 from the straight light guiding bar units 2200 as illustrated by the dotted line arrows extending from the straight light guiding bar units 2200. The light advances toward a upper front, lower front and front directions from the light guiding plate 2310 as illustrated by the arrows within dotted line box shown on the light guide plate 2310. The light is refracted on the turning sheet 2510 from the upper-lower and front directions to the front direction as illustrated by the arrows shown extending from the turning sheet 2510, and thus the light advancing toward the left-right direction of the turning sheet 2510 is maintained as zero. Thus, the light advancing toward the front direction of the turning sheet 2510 exits from the turning sheet 2510. Therefore, the observer located at the mid-section of the front of the backlight assembly 2000 may watch the image. In this case, the images displayed to the observer located at the mid-section of the front may be different from those displayed to the observer located at a different side of the front of the display apparatus 2000.

Referring to FIG. 8C, the observer is located at the left side of the display apparatus 2000, and thus the light sources 2115 at the right side of the oblique light guiding bar units 2100 are turned on. The light advances toward a left upper direction of the light guiding plate 2310 from the oblique light guiding bar unit 2100, as illustrated by the dotted line arrows extending from the oblique light guiding bar units 2100. The light advances toward an left upper front, left lower front and a left front directions of the turning sheet 2510 from the light guiding plate 2310 as illustrated by the arrows within dotted lines shown on the light guide plate 2310. The light is refracted on the turning sheet 2510 from the left upper-lower-front directions to the left direction, and thus the light advancing toward the left front direction of the turning sheet 2510 is maintained as illustrated by the arrows within dotted lines shown on the turning sheet 2510. Thus, the light advancing toward the front direction and the left direction of the turning sheet 2510 exits from the turning sheet 2510. Therefore, the observer located at the left side of the display apparatus 2000 may watch the image. In this case, the images displayed to the observer located at the left side of the front may be different from those displayed to the observer located at a different side of front of display apparatus 2000.

In addition, the light sources of the oblique light guiding bar units 2100 and the straight light guiding bar units 2200 may be selectively controlled, so that a dimming mode in which an image is dividedly displayed with a relatively brighter portion and a relatively darker portion may be operated. Thus, the display apparatus and the backlight assembly thereof may have high luminance with low power consumption.

Figure 9:
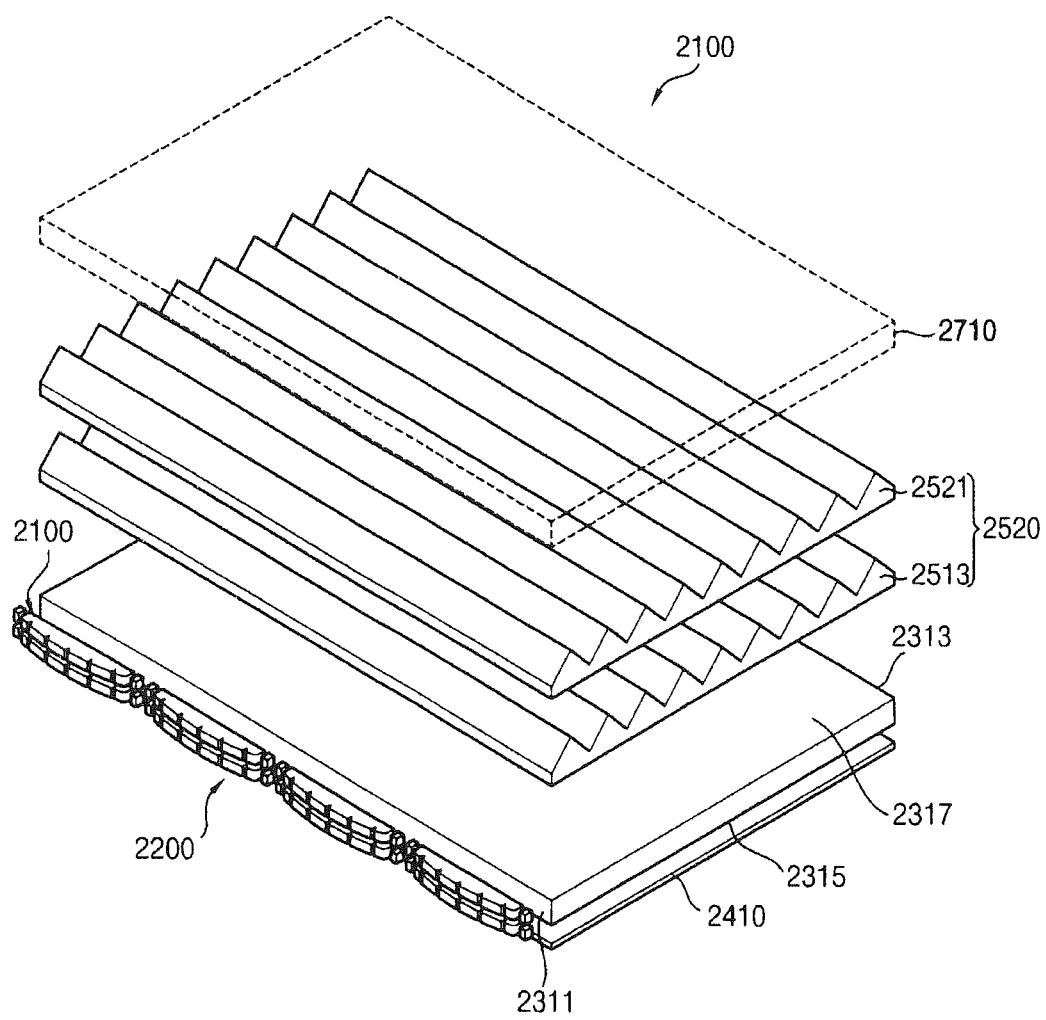
FIG. 9 is an exploded perspective view illustrating still another exemplary embodiment of a display apparatus according to the present invention.

FIG. 9 is an exploded perspective view illustrating another exemplary embodiment a display apparatus according to the present invention.

Referring to FIG. 9, the display apparatus 2100 according to the illustrated exemplary embodiment includes substantially the same or like parts as the display apparatus 2000 according to the previous exemplary embodiment in FIG. 7, except for a turning sheet 2520. Thus, further repetitive explanation concerning the above elements will be omitted.

The turning sheet 2510 of the display apparatus 2000 according to the previous exemplary embodiment in FIG. 7 includes a reverse-prism sheet. The prism patterns of the turning sheet 2510 are extended toward the light guiding plate 2310. However, the turning sheet 2520 of the display apparatus 2100 according to the illustrated exemplary embodiment includes two dual brightness enhancing films ("DBEFs") 2521 and 2513. Prism patterns of the dual brightness enhance film are extended toward a display panel 2710 disposed over the light guiding plate 2310. The turning sheets 2510 and 2520 refract the light from the light guiding plate 2310 to be advanced to the front direction of the turning sheets 2510 and 2520.

Figure 10A:
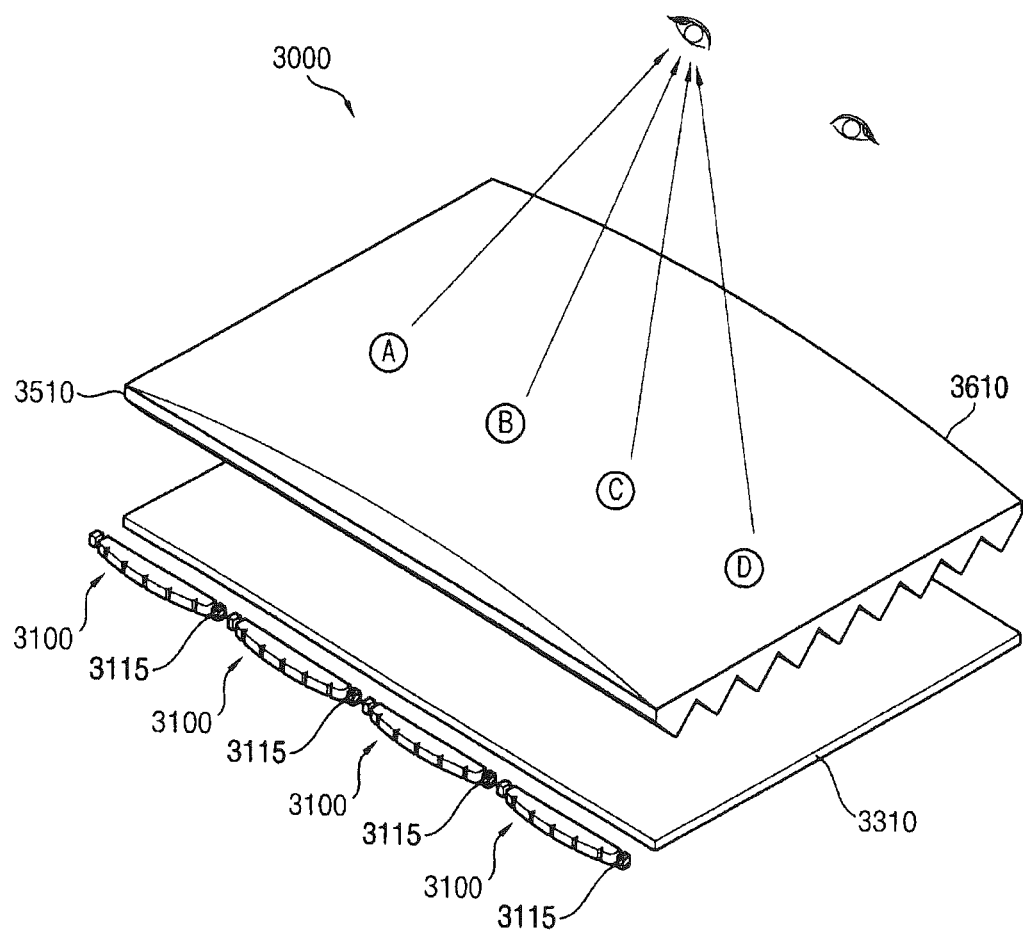
FIG. 10A is an exploded perspective view illustrating another exemplary embodiment of a backlight assembly according to the present invention.
Figure 10B:
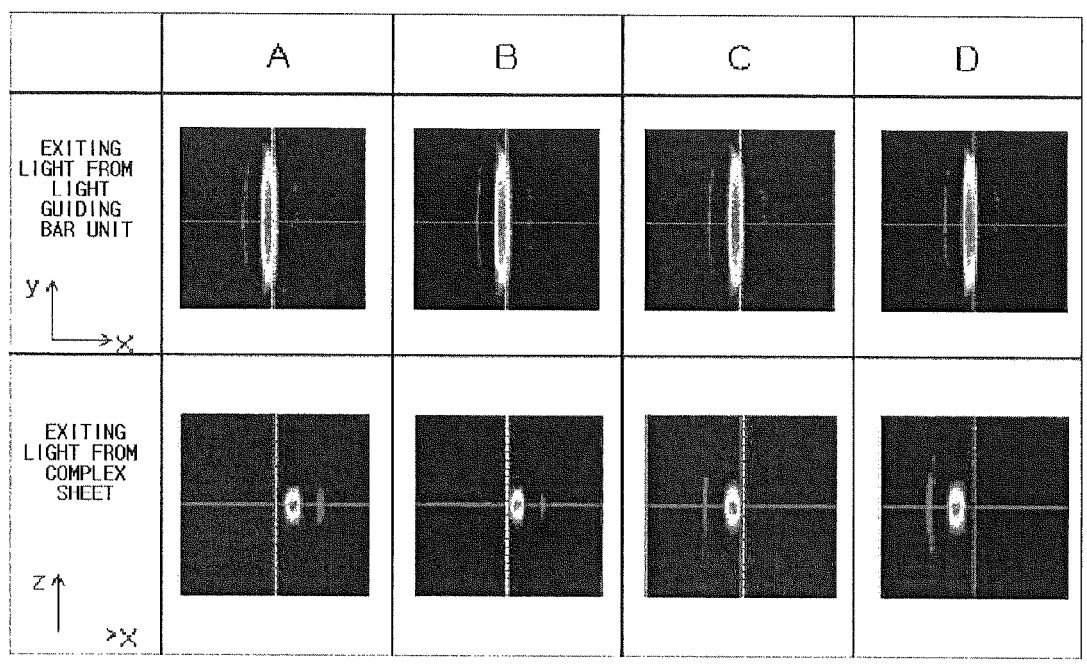
FIG. 10B is a graph illustrating distribution of exit light.

FIG. 10A is an exploded perspective view illustrating still another exemplary embodiment of a backlight assembly according to the present invention. FIG. 10B is a graphical illustrating distribution of exiting light in the backlight assembly in FIG. 10A.

Referring to FIG. 10A, the backlight assembly 3000 according to the illustrated exemplary embodiment includes an oblique light guiding bar unit 3100, a light guiding plate 3310, a turning sheet 3510 and a complex sheet 3610. The backlight assembly 3000 is substantially the same as the display apparatus 1000 according to the previous exemplary embodiment in FIG. 5 except that the backlight assembly 3000 includes the oblique light guiding bar unit 3100, the turning sheet 3510 and the complex sheet 3610 without the display panel 2710. Thus, further repetitive explanation concerning the above elements will be omitted A first light source 3111 and a second light source 3115 are disposed at opposing sides of the oblique light guiding bar unit 3100. The light from the first light source 3111 and the second light source 3115 is incident into the oblique light guiding bar unit 3100. The light is changed by the oblique light guiding bar unit 3100 into line-shape light having narrow right and left light distribution, and is incident into the light guiding plate 3310. In this case, when the light passes through the light guiding plate 3310, the light from the first light source 3111 and the light from the second light source 3115 have light advancing paths different from each other. The light guiding plate 3310 guides the incident light to the turning sheet 3510. The light from the light guiding plate 3310 exits toward an upper portion of the light guiding plate 3310. The turning sheet 3510 refracts the light from the turning sheet 3510 toward the front direction. Here, left and right direction vectors of the light from the oblique light guiding bar unit 3100 are maintained.

The turning sheet 3510 and the complex sheet 3610 collectively form a single, unitary, indivisible member as illustrated in FIG. 10A. The complex sheet 3610 condenses the light exiting from the turning sheet 3510 to left and right eyes of the observer. Thus, when the first light source 3111 of the oblique light guiding bar unit 3100 is turned on, the light advances the right eye of the observer. When the second light source 3115 of the oblique light guiding bar unit 3100 is turned on, the light advances the left eye of the observer. Accordingly, different images may be displayed to the left and right eyes of the observer, respectively. The light advancing paths are illustrated in FIG. 10A, when an image is focused on the left eye of the observer.

Referring to FIG. 10B, the light exiting from the complex sheet 3610 and the light exiting from the oblique light guiding bar units 3100 at points A, B, C and D is illustrated. The light exiting from the oblique light guiding bar unit 3100 is uniformly inclined to the left side of the light guiding bar units 3100 along a horizontal direction of the xy graph in FIG. 10B, and is variously distributed along a vertical direction of the xz graph in FIG. 10B. The light exits substantially perpendicular to the light guiding plate 3310 from the light guiding plate 3310. The x-direction may be the left-right direction, the y-direction may be the upper-lower direction and the z-direction may be front-back directions of the backlight assembly 3000.

Referring to FIG. 10A again, the points A, B, C and D were marked on the complex sheet 3610. In one embodiment, the oblique light guiding bar unit 3100, the light guiding plate 3310 of 15.6 inches, the turning sheet 3510 having prisms with a vertex angle of 70° and the complex sheet 3610 as an upper lens were used to measure light distribution at the points A, B, C and D. The second light source 3115 located at the right side of the oblique light guiding bar unit 3100 were driven to track the path of the light advancing to one eye. An exit angle of the light guiding plate 3310 may be controlled by a curvature of the complex sheet 3610.

The light was distributed to have different paths at the points A, B, C and D, respectively. Although the light had the different paths at the point A, B, C and D, the light from the light guiding plate 3310 is condensed on the left eye of the observer. Thus, the observer may watch the image only through the left eye.

Figure 11:
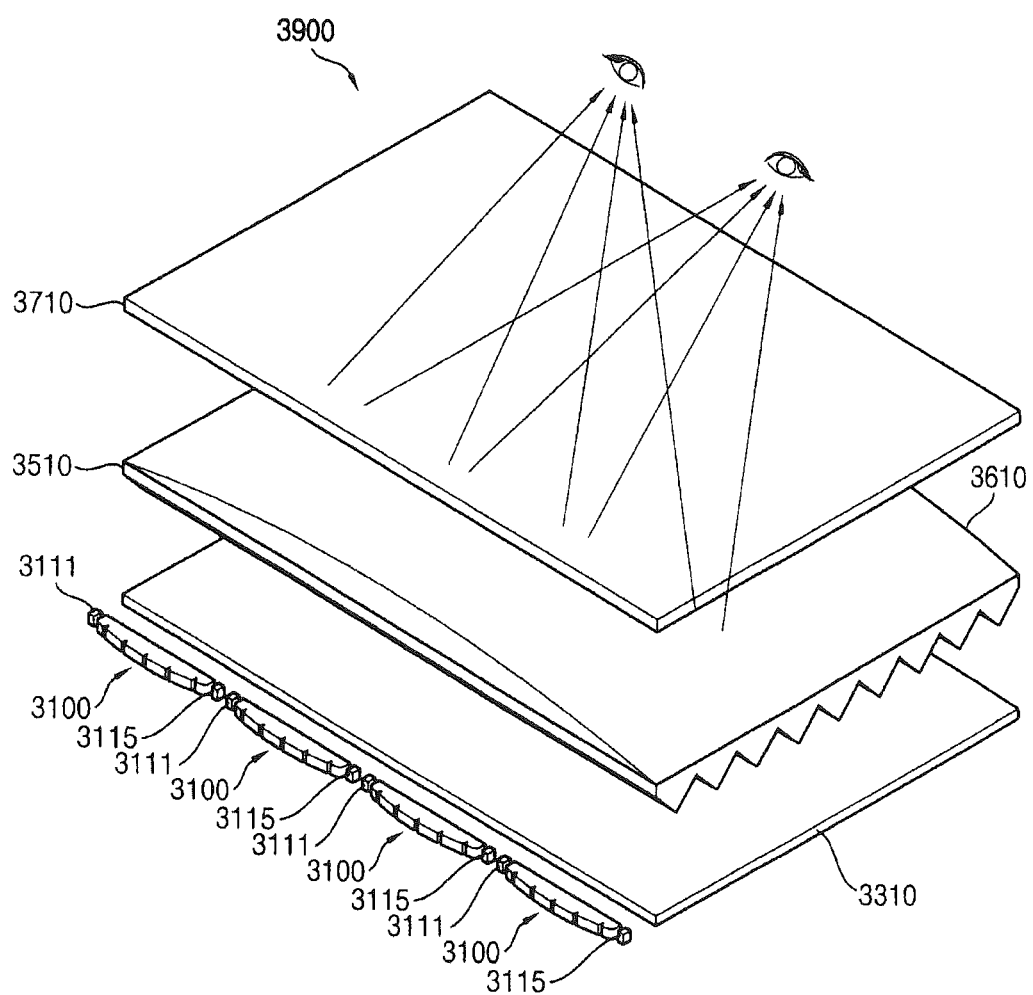
FIG. 11 is an exploded perspective view illustrating an exemplary embodiment of a display apparatus including the backlight assembly in FIG. 10A.

FIG. 11 is an exploded perspective view illustrating an exemplary embodiment of a display apparatus including the backlight assembly 3000 in FIG. 10A.

The display apparatus 3900 according to the illustrated exemplary embodiment includes the oblique light guiding bar unit 3100, the light guiding plate 3310, the turning sheet 3510, the complex sheet 3610 and a display panel 3710. The display apparatus 3900 further includes the display panel 3710 compared to the backlight assembly 3000 in FIG. 10A. The oblique light guiding bar unit 3100, the light guiding plate 3310, the turning sheet 3510 and the complex sheet 3610 are substantially the same or like parts as the backlight assembly 3000 in FIG. 10A, and thus, further repetitive explanation concerning the above elements will be omitted.

The display apparatus 3900 according to the illustrated exemplary embodiment displays the 3D stereoscopic image by driving the oblique light guiding bar unit 3100 with the display panel 3710. When the first light source 3111 disposed at the left side of the oblique light guiding bar unit 3100 is driven, the display apparatus 3900 displays an image perceived by a right eye of the observer. When the second light source 3115 disposed at the right side of the oblique light guiding bar unit 3100 is driven, the display apparatus 3900 displays an image perceived by a left eye of the observer. Thus, the observer recognizes two different images at left and right eyes respectively at the same time. Accordingly, the observer may watch the 3D stereoscopic image without additional special glasses.

Generally, a distance between two eyes is between about 6 centimeters (cm) and about 7 cm. Thus, the light path difference between for the left and right eyes should be precise. The oblique light guiding bar unit 3100 according to the illustrated exemplary embodiment precisely controls the difference. Thus, the observer may watch the different images at the left and right eyes, respectively.

Figure 12:
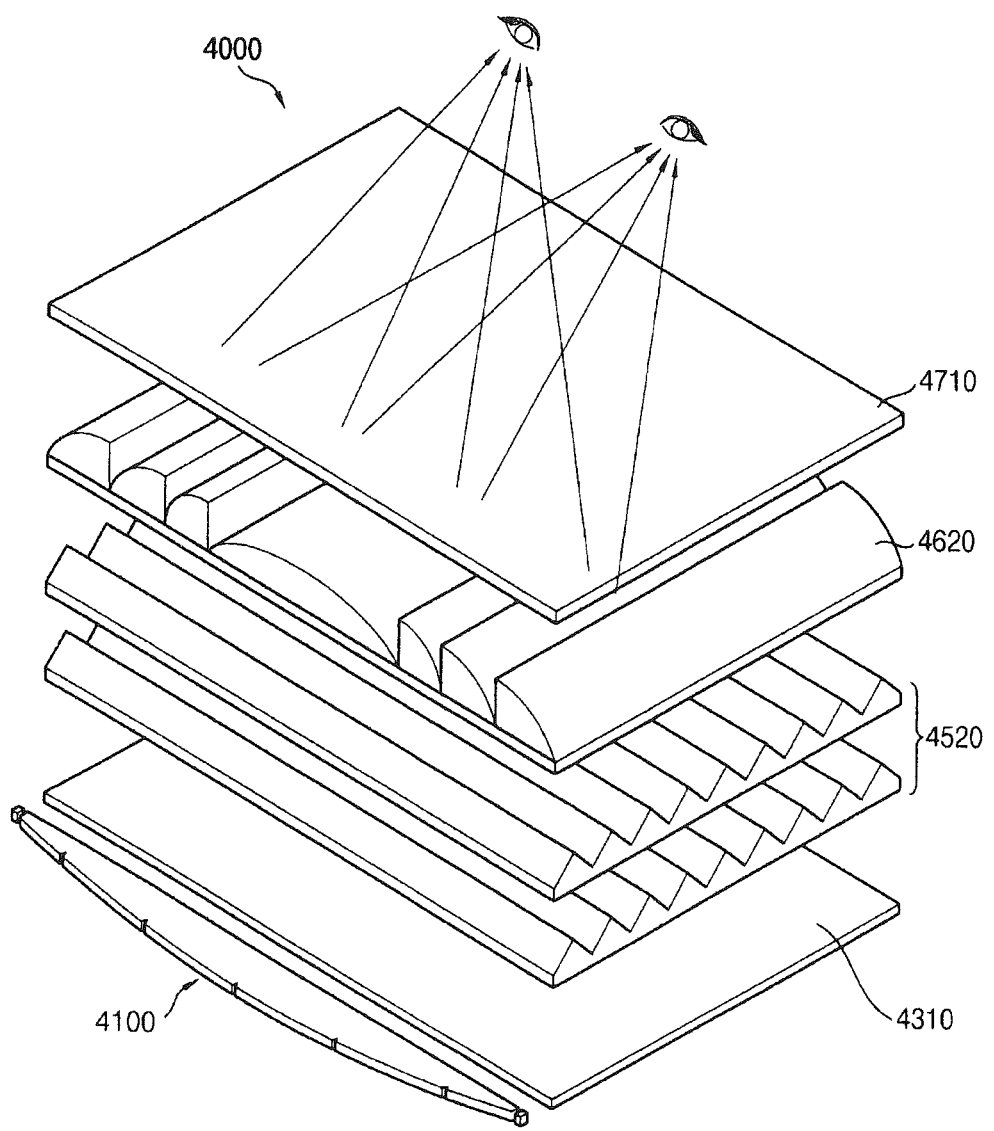
FIG. 12 is an exploded perspective view illustrating still another exemplary embodiment of a display apparatus according to the present invention.

FIG. 12 is an exploded perspective view illustrating still another exemplary embodiment of a display apparatus according to the present invention.

The display apparatus 4000 according to the illustrated exemplary embodiment is substantially the same as the display apparatus 3900 according to the previous exemplary embodiment in FIG. 11 except for the complex sheet 3610, the turning sheet 3510 and the number of the oblique light guiding bar unit 3100. Thus, further repetitive explanation concerning the above elements will be omitted.

Referring to FIG. 12, the display apparatus 4000 according to the illustrated exemplary embodiment includes only one oblique light guiding bar unit 4100, a light guiding plate 4310, a turning sheet 4520, a complex sheet 4620 and a display panel 4710. The complex sheet 4620 controls a light path from the light guiding plate 4310. The complex sheet 4620 may include a Fresnel lens. The turning sheet 4520 may include two DBEFs 4520. Prism patterns of the dual brightness enhance film face the complex sheet 4620. The Fresnel lens as the complex sheet 4620 and the DBEFs 4520 may not be used at the same time. The Fresnel lens may be replaced by other complex films, and the DBEFs 4520 may be replaced by other turning films. The light passes through the oblique light guiding bar unit 4100 and the light guiding plate 4310 to be collimated at all directions, and then the light passes through the turning sheet 4520 and exits to the front direction. Finally, the light passes through the complex sheet 4620, and is condensed on each of the left and right eyes of the observer which is located at a focal length from the display apparatus 4000. Thus, the display apparatus 4000 may display the 3D stereoscopic image with high luminance.

Figure 13:
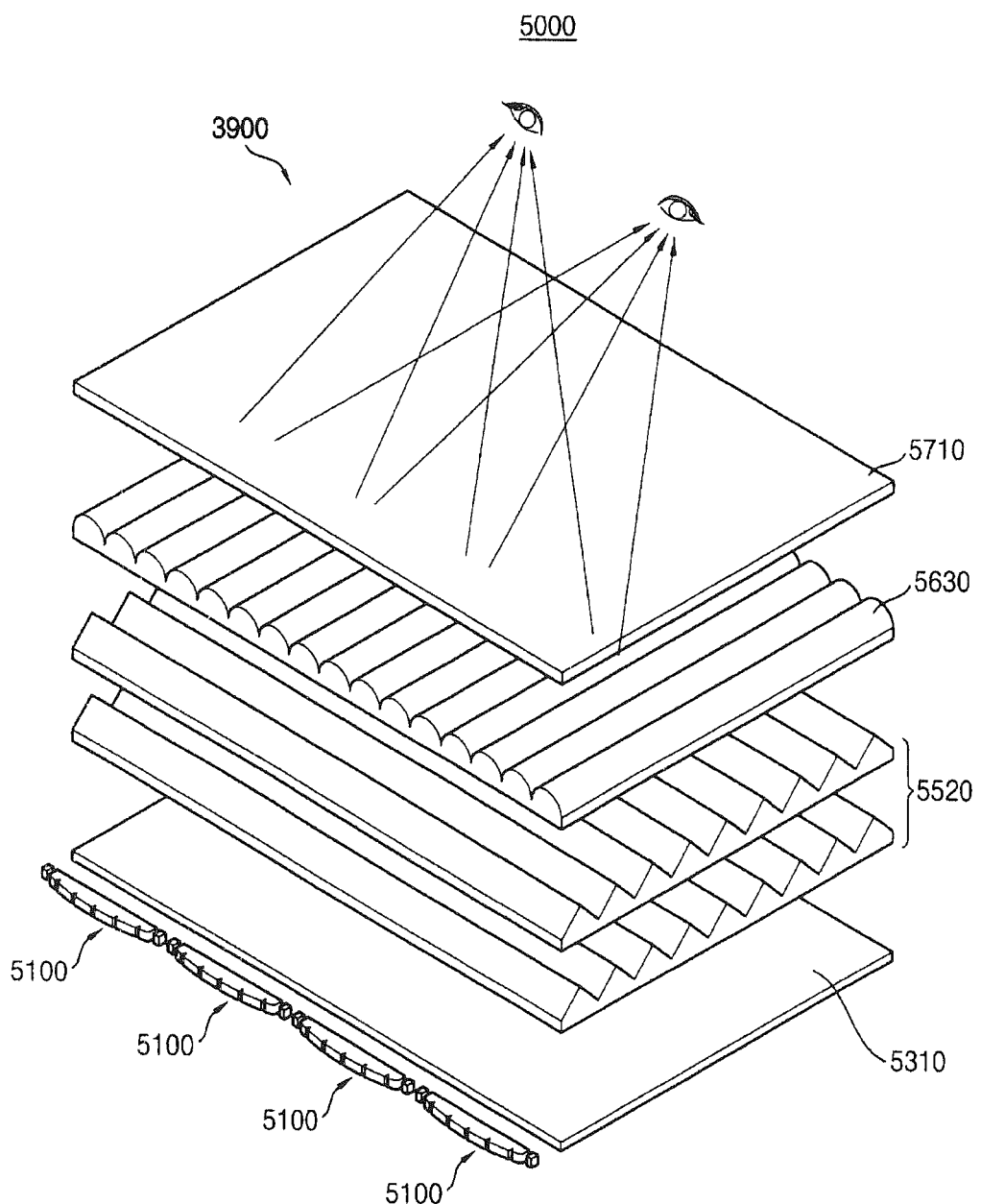
FIG. 13 is an exploded perspective view illustrating still another exemplary embodiment of a display apparatus according to still the present invention.

FIG. 13 is an exploded perspective view illustrating still another exemplary embodiment of a display apparatus according to the present invention.

The display apparatus 5000 according to the illustrated exemplary embodiment is substantially the same as the display apparatus 3900 according to the previous exemplary embodiment in FIG. 11, except for the complex sheet 3610, the turning sheet 3510 and the number of the oblique light guiding bar unit 3100. Thus, further repetitive explanation concerning the above elements will be omitted.

Referring to FIG. 13, the display apparatus 5000 according to the illustrated exemplary embodiment includes oblique light guiding bar units 5100, a light guiding plate 5310, a turning sheet 5520, a complex sheet 5630 and a display panel 5710. The complex sheet 5630 includes a lenticular lens, or a plurality of lenticular lenses. The lenticular lens is manufactured much easier than the Fresnel lens. However, the lenticular lens has an aberration distorting the image far from the center of the lens. To compensate the aberration, patterns of the oblique light guiding bar units 5100 are controlled to distribute the light exiting from the oblique light guiding bar units 5100, so that the light incident into the light guiding plate 5310 may be condensed with respect to the center of the light guiding plate 5310. Thus, the aberration may be decreased and a crosstalk may be reduced or effectively prevented.

According to the invention, when using a straight light guiding bar unit and an oblique light guiding bar unit, light sources of the light guiding bar units are controlled to emit the light to a front or viewing direction. Thus, distribution of exiting light may be controlled without an additional film. In addition, an exiting angle of the light may be controlled without the additional film such as a security film separately kept or carried by users.

In addition, since the light is provided to a predetermined position, the image may be displayed with low power consumption. In addition, the light is condensed at the predetermined position, and thus the image having a high luminance may be displayed.

In addition, the light sources are selectively driven based on a position of the observer to display the image, using a sensor detecting the position of the observer. Thus, even though the number of the observers is changed, the number of the driven light sources is constant, so that the image having a high luminance may be displayed with low power consumption.

In addition, left and right light sources of the oblique light guiding bar unit are alternately driven to emit the light to left and right directions respectively, so that a 3D stereoscopic image may be displayed without special glasses. In addition, the 3D stereoscopic image may be displayed without an additional special film separately kept or carried by users, or a polarization film.

In addition, the light condensed by the light guiding bar unit and the light guiding plate is provided, so that the high luminance image may be displayed to the observer. A pattern of the light incident portion in the light guiding bar unit is changed to control a light advancing path or to prevent a crosstalk from occurring due to a broad distribution of the light, and so on.

In addition, using an oblique light guiding bar unit, the light may be emitted to a front side direction or a front center direction, and thus a plurality of images may be displayed according to viewing angles of the observer. Thus, a movie may be displayed on a front center view, and a GPS map may be displayed on a front side view at the same time.

While the invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A light guiding bar comprising:
first and second light incident portions at opposite ends of the light guiding bar and receiving light;
a light exit portion which extends in a first direction, wherein the light exit portion partially totally reflects and partially emits the light according to an incident angle; and
a reflecting portion which extends in the first direction and is adjacent to the light exit portion, and includes a plurality of reflecting surfaces facing the light exit portion, each of the reflecting surfaces having a wedge shape, wherein the reflecting surfaces reflect the light toward the light exit portion in a direction inclined with respect to a second direction substantially perpendicular to the first direction,
wherein
the light incident into the first and second light incident portions and directly incident on the light exit portion is totally reflected by the light exit portion, the light exits from the light exit portion toward the second light incident portion with an inclined angle between about 4° and about 7° with respect to the second direction when the light is incident into the first light incident portion, and the light exits from the light exit portion toward the first light incident portion with an inclined angle between about −4° and about −7° with respect to the second direction when the light is incident into the second light incident portions.

2. The light guiding bar of claim 1, wherein a width in the second direction at a central portion of the light guiding bar is larger than a width at the ends.

3. The light guiding bar of claim 1, wherein the light exits from the light exit portion toward the second light incident portion with an inclined angle between about 1° and about 3° with respect to the second direction when the light is incident into the first light incident portion, and the light exits from the light exit portion toward the first light incident portion with an inclined angle between about −1° and about −3° with respect to the second direction when the light is incident into the second light incident portions.

4. A backlight assembly comprising:

an oblique light guiding bar unit comprising:

an oblique light guiding bar comprising:

first and second light incident portions at opposite ends of the oblique light guiding bar and receiving light;

a light exit portion which extends in a first direction, wherein the light exit portion partially totally reflects and partially emits the light according to an incident angle; and a reflecting portion which extends in the first direction and is adjacent to the light exit portion, and includes a plurality of reflecting surfaces, each of the reflecting surfaces having a wedge shape, wherein the reflecting surfaces reflect the light toward the light exit portion in a direction inclined with respect to a second direction substantially perpendicular to the first direction, wherein the light incident into the first and second light incident portions and directly incident on the light exit portion is totally reflected by the light exit portion;

a first light source generating and supplying the light to the first light incident portion;

a second light source generating and supplying the light to the second light incident portion, wherein the light exits from the light exit portion toward the second light incident portion with an inclined angle between about 4° and about 7° with respect to the second direction when the first light source of the oblique light guiding bar unit is driven, and the light exits from the light exit portion toward the first light incident portion with an inclined angle between about −4° and about −7° with respect to the second direction when the second light source of the oblique light guiding bar unit is driven; and a light guiding plate comprising:

an incident surface adjacent to the light exit portion and receiving the light from the oblique light guiding bar;

a rear surface opposite to the incident surface; and a first surface which connects the incident surface with the rear surface, wherein the first surface emits the light from the light guiding plate.

5. The backlight assembly of claim 4, wherein the first and second light sources comprise a light-emitting diode.

6. The backlight assembly of claim 4, further comprising a turning sheet facing the first surface of the light guiding plate, wherein the turning sheet directs the light from the light guiding plate to a front portion of the backlight assembly.

7. The backlight assembly of claim 6, wherein the turning sheet comprises a prism pattern facing the first surface of the light guiding plate.

8. The backlight assembly of claim 6, wherein the turning sheet comprises two dual brightness enhancing films having a prism pattern on a surface of the turning sheet opposite to the light guiding plate.

9. The backlight assembly of claim 4, wherein a height of the incident surface of the light guiding plate is larger than a height of the rear surface.

10. The backlight assembly of claim 4, wherein a height of the incident surface of the light guiding plate is smaller than a height of the rear surface, and the rear surface comprises a reflection surface reflecting incident light.

11. The backlight assembly of claim 4, wherein a number of the oblique light guiding bar unit is plural, and the oblique light guiding bar units are disposed in a line in the first direction.

12. The backlight assembly of claim 4, further comprising:

a straight light guiding bar unit comprising:

a straight light guiding bar comprising:

first and second light incident portions at opposite ends of the straight light guiding bar and receiving light;

a light exit portion which extends in the first direction, wherein the light exit portion partially total reflects and partially emits the light according to an incident angle; and a reflecting portion which extends in the first direction and is adjacent to the light exit portion, and includes a plurality of reflecting surfaces facing the light exit portion, each of the reflecting surfaces having a wedge shape, wherein the reflecting surfaces reflect the light toward the light exit portion in a direction inclined with respect to the second direction, wherein the light incident into the first and second light incident portions of the straight light guiding bar and directly incident on the light exit portion of the straight light guiding bar is totally reflected by the light exit portion of the straight light guiding bar;

a first light source supplying the light to the first light incident portion of the straight light guiding bar; and a second light source supplying the light to the second light incident portion of the straight light guiding bar.

13. The backlight assembly of claim 12, wherein a number of the straight light guiding bar unit and a number of the oblique light guiding bar unit are plural, and the straight light guiding bar units and the oblique light guiding bar units are alternately disposed in a line in the first direction, respectively.

14. The backlight assembly of claim 13, further comprising a plurality of light source modules, wherein the light source modules are disposed on the incident surface of the light guiding plate in a line different from the lines in which the oblique light guiding bar units and the straight light guiding bar units are disposed.

15. The backlight assembly of claim 12, wherein
a number of the oblique light guiding bar unit and a number of the straight light guiding bar unit are plural,
the oblique light guiding bar units are disposed in a first line in the first direction and facing the incident surface of the light guiding plate, and
the straight light guiding bar units are disposed in a second line in the first direction and facing the incident surface of the light guiding plate, the first and second lines being in different planes.

16. The backlight assembly of claim 4, further comprising a complex sheet which overlaps the first surface of the light guiding plate, wherein the complex sheet changes an advancing path of the light from the light guiding plate and collects the light at positions in which two vision points of an observer are disposed.

17. The backlight assembly of claim 16, wherein
the light exits from the light exit portion toward the second light incident portion with an inclined angle between about 1° and about 3° with respect to the second direction when the first light source of the oblique light guiding bar unit is driven, and
the light exits from the light exit portion toward the first light incident portion with an inclined angle between about −1° and about −3° with respect to the second direction when the second light source of the oblique light guiding bar unit is driven.

18. A display apparatus comprising:
an oblique light guiding bar unit comprising:
  an oblique light guiding bar comprising:
    first and second light incident portions at opposite ends of the oblique light guiding bar and receiving light;
    a light exit portion which extends in a first direction, wherein the light exit portion partially totally reflects and partially emits the light according to an incident angle; and
    a reflecting portion which extends in the first direction and is adjacent to the light exit portion, and including a plurality of reflecting surfaces, each of the reflecting surfaces having a wedge shape, wherein the reflecting portion reflects the light in a direction inclined with respect to a second direction substantially perpendicular to the first direction,
    wherein the light being incident into the first and second light incident portions and directly incident on the light exit portion is totally reflected by the light exit portion;
  a first light source generating and supplying the light to the first light incident portion; and
  a second light source generating and supplying the light to the second light incident portion,
  wherein
    the light exits from the oblique light guiding bar unit toward the second light incident portion of the oblique light guiding bar with an inclined angle between about 4° and about 7° with respect to the second direction when the first light source of the oblique light guiding bar unit is driven, and
    the light exits from the oblique light guiding bar unit toward the first light incident portion from the oblique light guiding bar with an inclined angle between about −4° and about −7° with respect to the second direction when the second light source of the oblique light guiding bar unit is driven;
a light guiding plate comprising:
  an incident surface adjacent to the light exit portion and receiving the light from the oblique light guiding bar;
  a rear surface facing the incident surface; and
  a first surface which connects the incident surface with the rear surface, wherein the first surface emits the light from the light guiding plate; and
a display panel which displays an image using the light from the light guiding plate.

19. The display apparatus of claim 18, further comprising:
a straight light guiding bar unit comprising:
  a straight light guiding bar comprising:
    first and second light incident portions at opposite ends of the straight light guiding bar and receiving light;
    a light exit portion which extends in the first direction, wherein the light exit portion partially totally reflects and partially emits the light according to an incident angle; and
    a reflecting portion which extends in the first direction and is adjacent to the light exit portion, and including a plurality of reflecting surfaces, each of the reflecting surfaces having a wedge shape, wherein the reflecting surfaces reflect the light toward the light exit portion in a direction inclined with respect to the second direction,
    wherein the light incident into the first and second light incident portions of the straight light guiding bar and directly incident on the light exit portion of the straight light guiding bar is totally reflected by the light exit portion of the straight light guiding bar;
  a first light source generating and supplying the light to the first light incident portion of the straight light guiding bar; and
  a second light source generating and supplying the light to the second light incident portion of the straight light guiding bar.

20. The display apparatus of claim 19, wherein
the display panel displays a first image inclined with respect to a viewing surface of the display panel, when the light sources of the oblique light guiding bar unit are driven, and
the display panel displays a second image substantially perpendicular to viewing surface of the display panel, when the light sources of the straight light guiding bar unit are driven.

21. The display apparatus of claim 18, further comprising a complex sheet which overlaps the first surface of the light guiding plate, wherein the complex sheet changes an advancing path of the light from the light guiding plate and collects the light at positions in which two vision points of an observer are disposed.

22. The display apparatus of claim 21, wherein the complex sheet comprises a Fresnel lens.

23. The display apparatus of claim 21, wherein the complex sheet comprises a lenticular lens.

24. The display apparatus of claim 21, wherein
the light exits from the light exit portion toward the second light incident portion with an inclined angle between about 1° and about 3° with respect to the second direction when the first light source of the oblique light guiding bar unit is driven, and
the light exits from the light exit portion toward the first light incident portion with an inclined angle between about −1° and about −3° with respect to the second direction when the second light source of the oblique light guiding bar unit is driven.

25. The display apparatus of claim 21, wherein
the first and second light sources of the oblique light guiding bar unit are alternately driven, and
the display panel displays a first image perceived by a first vision point of the observer when the first light source of the oblique light guiding bar unit is driven, and the display panel displays a second image perceived by a second vision point of the observer when the second light source of the oblique light guiding bar unit is driven, so that a stereoscopic image is displayed.

* * * * *